United States Patent
Kubota et al.

(10) Patent No.: US 10,623,314 B2
(45) Date of Patent: Apr. 14, 2020

(54) SWITCH SYSTEM, AND MONITORING CENTRALIZED CONTROL METHOD

(75) Inventors: Kazushi Kubota, Tokyo (JP); Masanori Takashima, Tokyo (JP); Yoji Suzuki, Tokyo (JP); Masashi Hayashi, Tokyo (JP); Tetsu Izawa, Tokyo (JP)

(73) Assignee: NEC Corporation, Tokyo (JP)

( * ) Notice: Subject to any disclaimer, the term of this patent is extended or adjusted under 35 U.S.C. 154(b) by 388 days.

(21) Appl. No.: 13/824,356

(22) PCT Filed: Sep. 26, 2011

(86) PCT No.: PCT/JP2011/071823
§ 371 (c)(1),
(2), (4) Date: Mar. 16, 2013

(87) PCT Pub. No.: WO2012/049960
PCT Pub. Date: Apr. 19, 2012

(65) Prior Publication Data
US 2013/0176888 A1 Jul. 11, 2013

(30) Foreign Application Priority Data
Oct. 15, 2010 (JP) .................... 2010-232772

(51) Int. Cl.
*H04L 12/56* (2006.01)
*H04L 12/721* (2013.01)
(Continued)

(52) U.S. Cl.
CPC ............ *H04L 45/70* (2013.01); *H04L 43/026* (2013.01); *H04L 45/38* (2013.01); *H04L 49/35* (2013.01)

(58) Field of Classification Search
CPC ..... H04L 45/70; H04L 49/90; H04L 67/1095; H04L 29/1097; H04L 12/26; H04L 12/931; H04L 12/721
(Continued)

(56) References Cited

U.S. PATENT DOCUMENTS 7,215,641 B1 5/2007 Bechtolsheim et al.
7,281,085 B1 * 10/2007 Garg ................... G11C 15/00
370/235

(Continued)

FOREIGN PATENT DOCUMENTS

CN 1484413 A 3/2004
CN 1798096 A 7/2006
(Continued)

OTHER PUBLICATIONS

OpenFlow Switch Specification 1.0.1 (Wire Protocol 0x01) Dec. 31, 2009.*
(Continued)

*Primary Examiner* — Charles C Jiang
*Assistant Examiner* — Voster Preval
(74) *Attorney, Agent, or Firm* — Finnegan, Henderson, Farabow, Garrett & Dunner, L.L.P.

(57) ABSTRACT

A switch system allows free change of a grain degree of monitoring without being conscious of a routing control. For example, a control protocol of a transmitter is used based on the open flow (OpenFlow) technique to control the monitoring function of the switch system, and the centralized control of the monitoring can be realized as the whole network and the monitoring result is reflected on the routing control. Here, the switch has a flow table for packet transfer and a flow table for monitoring. Both of the tables are searched to one packet and a multi-hit operation is performed to execute the operation of each of the entries. That is, both the tables are searched and the packet is transferred according to corresponding flow entries.

16 Claims, 18 Drawing Sheets

(51) Int. Cl.
*H04L 12/931* (2013.01)
*H04L 12/26* (2006.01)
(58) Field of Classification Search
USPC .................................................. 370/252, 400
See application file for complete search history.

(56) References Cited

U.S. PATENT DOCUMENTS

| | | | |
|---|---|---|---|
| 2004/0010712 A1 | 1/2004 | Hui et al. | |
| 2006/0029075 A1* | 2/2006 | Sheppard | H04L 29/06 370/392 |
| 2007/0204060 A1* | 8/2007 | Higuchi | H04L 43/16 709/234 |
| 2007/0271374 A1 | 11/2007 | Shomura et al. | |
| 2007/0280266 A1* | 12/2007 | Chao | H04L 12/4645 370/395.53 |
| 2009/0138577 A1* | 5/2009 | Casado | H04L 41/06 709/220 |
| 2011/0170552 A1* | 7/2011 | Suzuki | H04L 49/9078 370/401 |
| 2011/0317559 A1* | 12/2011 | Kern | H04L 45/02 370/235 |
| 2012/0039338 A1* | 2/2012 | Morimoto | 370/392 |
| 2012/0044813 A1* | 2/2012 | Nandagopal | H04L 45/28 370/242 |

FOREIGN PATENT DOCUMENTS

| | | |
|---|---|---|
| CN | 101014015 A | 8/2007 |
| CN | 101075911 A | 11/2007 |
| JP | 2003-501880 A | 1/2003 |
| JP | 2004-356953 A | 12/2004 |
| JP | 3704134 B2 | 10/2005 |
| JP | 2007-336512 A | 12/2007 |
| WO | WO 2005-022850 A1 | 3/2005 |
| WO | WO 2012/070173 A1 | 5/2012 |
| WO | WO 2013/008134 A2 | 1/2013 |

OTHER PUBLICATIONS

Opneflow-spec-v1.0.0.*
Openflow Switch Specification 1.0.0.*
International Search Report (ISR) (PCT Form PCT/ISA/210), PCT/JP2011/071823, dated Dec. 13, 2011.
"OpenFlow switch Specification Version 1.0.0 (Wire Protocol 0x01) Dec. 31, 2009" <http://www.openflowswitch.org/documents/openflow-spec-v1.0.0.pdf>.
Akio Iijima, et al., "Cloud Computing Jidai no Datacenter to Network no Shoene Gijutsu", NEC Technical Journal, Sep. 25, 2009, vol. 62, No. 3, p. 117 to 120 (with English concise explanation).
Hideyuki Shimonishi, "Shorai no Cloud Kiaban Gijutsu o Sasaeru Kenkyu Kaihatsu", NEC Technical Journal, Apr. 23, 2010, vol. 63, No. 2, p. 119 to 123 120 (with English concise explanation).
Saburo Seto, et al., "A study of protocol monitoring method with flow control", Technical Report of IEICE, ICM2009-13,The Institute of Electronics, Information Engineers, Jul. 2, 2009, p. 1 to 6 (with English Abstract).
English translation of PCT/ISA/237 (written opinion of the international searching authority, dated Dec. 13, 2011), dated Apr. 23, 2013.
PCT/IB/373.
Japanese Office Action dated Nov. 22, 2013, with partial English translation.
[White Paper CLEAR-Flow], Extreme Networks, 2005.
Hideyuki Shimonishi et al., [Proposal of Network OS for Integrated Control Brain and Application of Its OpenFlow Controller], Technical Research Report of the Institute of Electronics, Information and Communication Engineers, (Communication Technology Report), vol. 109, No. 448, Feb. 25, 2010, pp. 1-6 (NS2009-162).
Chinese Office Action dated Dec. 8, 2014 with and English Translation thereof.
Wei, Xingjun, "Research and Implementation of OpenFlow Switch model and critical technology", Database of Chinese master papers, Information technology vol. 2010, $5^{th}$, May 15, 2010.
Korean Office Action dated Mar. 14, 2014, with English translation.
Chinese Office Action dated Jul. 7, 2015 with partial English translation.
Japanese Office Action dated Feb. 2, 2015 with a partial English language translation thereof.
Extended European Search Report issued by the European Patent Office in counterpart European Patent Application No. 11832398.9, dated Feb. 24, 2017.
First Office Action issued by the Chinese Patent Office dated Sep. 4, 2017 in counterpart Chinese Patent Application No. 201510271229.3.
Japanese Office Action dated Jun. 9, 2015 with a partial English translation.
OpenFlow Switch Specification, Version 1.1.0 (draft), pp. 4-17, 22-24, [online], Oct. 8, 2010 [searched on Jun. 2, 2015], the Internet <URL: http://archive.openflow.org/documents/openflow1.1-allmerged-draft0.pdf>.
Tsuji, Akira, et al. "Application Deployment Optimization for Distributed Computing Environment with OpenFlow." IPSJ SIG Technical Report, Computer Architecture (ARC), Information Processing Society of Japan, Apr. 15, 2010, No. 188.
McKeown, Nick, et al., OpenFlow: Enabling Innovation in Campus Networks, [online], Mar. 14, 2008 [searched on Jun. 2, 2015], the Internet <URL: http://archive.openflow.org/documents/openflow-wp-latest.pdf>.

* cited by examiner

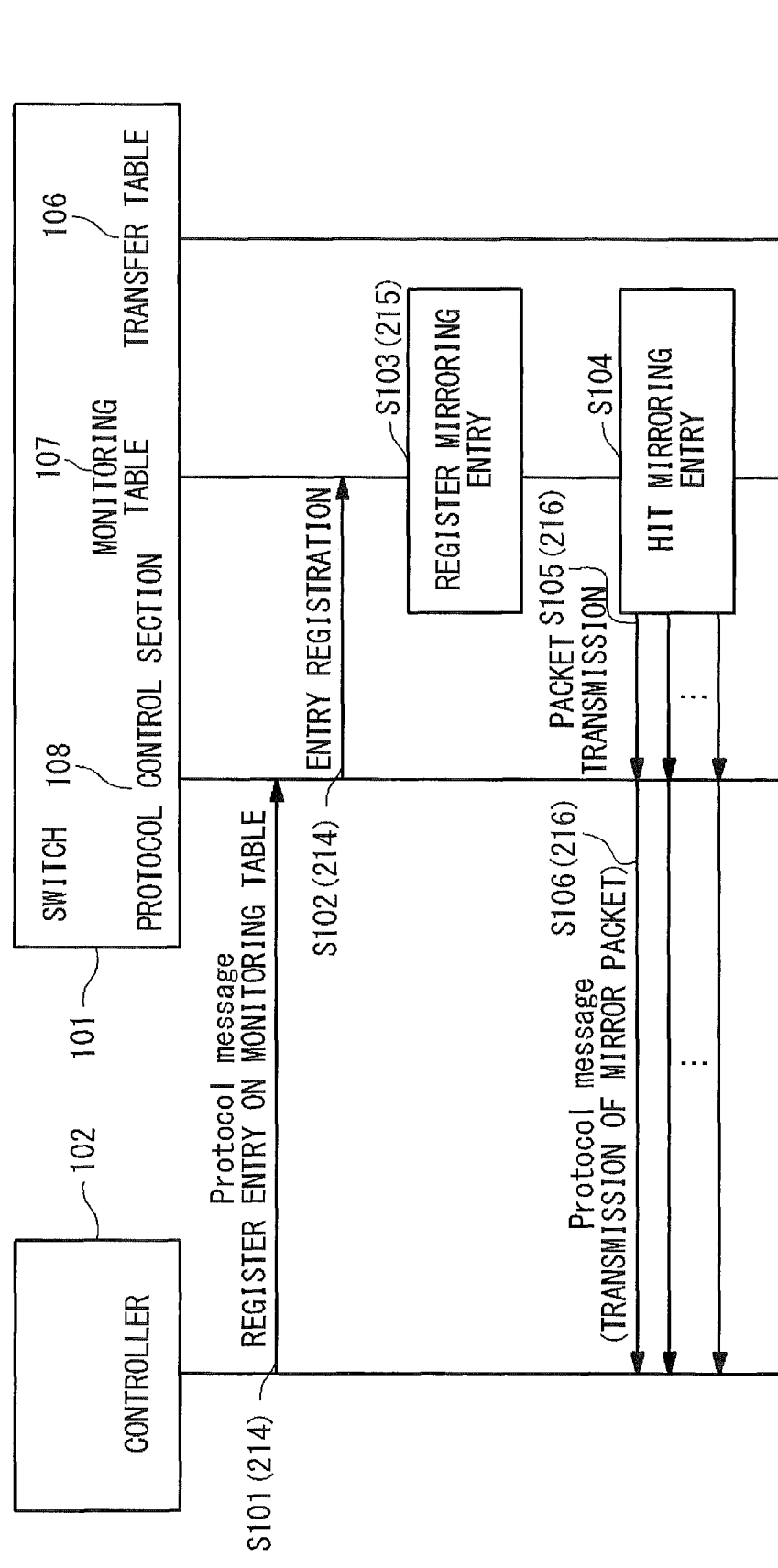

SWITCH SYSTEM, AND MONITORING CENTRALIZED CONTROL METHOD

TECHNICAL FIELD

The present invention is related to a switch system, especially, to a switch system which carries out a routing control.

BACKGROUND ART

In a conventional technique, the monitoring functions of "sFlow", "RSPAN (Remote switched Port Analyzer)" and so on exist in each of switches of a switch system. For this reason, each switch can perform the monitoring, but it was difficult to perform the centralized control of the monitoring functions.

Although there is a function such as "sFlow" in which the centralized control can be applied, there are many constraints that each switch needs to be configured and the grain degree of the monitoring itself is limited, so that there is no degree of freedom to the centralized control of the monitoring.

Also, even if the centralized control can be applied to the function, the function is only the centralized control of the monitoring, and the routing control cannot be coupled with the function. Therefore, the grain degree of the monitoring cannot be changed based on the monitoring result and the monitoring result cannot be reflected on the routing control of the network.

At present, the routing control using the open flow (OpenFlow) technique for the control protocol of the transmitter device has been studied as one of the routing control techniques of the network communication. The details of the open flow technique are described in Non-Patent Literatures 1 and 2. The routing control using the open flow technique is called an open flow network.

In the open flow network, a controller such as an OFC (OpenFlow controller) controls the behavior of the switch such as an OFS (OpenFlow switch) by manipulating the flow table (Flow Table) of the switch. The controller and the switch are connected by a secure channel for the controller to control the switch by using an open flow protocol based control message.

The switches in the open flow network configure an open flow network, and are edge switches and core switches which are under the control of the controller. A series of operations from the reception of a packet (communication data) by an input side edge switch to the transmission of the packet from an output side edge switch in the open flow network is called a flow.

A flow table is a table in which a flow entry is registered to define a predetermined action (predetermined processing) to be performed on a packet group (a packet sequence) hit or adapted to a predetermined rule (a match condition).

The rule of the flow entry is defined or distinguished based on any one or all of a destination address, a source address, a destination port, and a source port, which are contained in a header region of the packet for each protocol layer. It should be noted that the addresses contains a MAC address (Media Access Control Address) and IP address (Internet Protocol Address). Also, the data of an ingress port in addition to the above can be used as the rule of the flow entry.

The action of the flow entry shows operation such as "outputting at a specific port", "discarding", "rewriting a header". For example, the switch outputs a packet to the port corresponding to the action when identification data of the output port (output port number and so on) is shown in the action of the flow entry, and discards the packet when the identification data of the output port is not shown. Or, the switch rewrites the header of the packet based on header data when the header data is shown by the action of the flow entry.

The switch in the open flow network executes the action of the flow entry to the packet group hitting the rule of the flow entry registered on the flow table.

In the control system using the open flow technique, it is possible to monitor the communication by acquiring the statistic data every flow entry.

However, in the control system using the open flow technique as it is, the statistic data has a one-to-one relation to the routing control entry of the flow. Accordingly, the grain degree of the monitoring needs to be set while being is conscious of the routing control entry of the flow.

CITATION LIST

[Non-Patent Literature 1] "The OpenFlow switch Consortium"<http://www.openflowswitch.org/>
[Non-Patent Literature 2] "OpenFlow switch Specification Version 1.0.0 (Wire Protocol 0x01) Dec. 31, 2009"<http://www.openflowswitch.org/documents/openflow-spec-v1.0.0.pdf>

SUMMARY OF THE INVENTION

The present invention may provide a switch system in which the centralized control can be applied to the monitoring of the switch system.

The switch system of the present invention contains a switch, a controller and a neighboring switch. The switch transfers a packet according to a flow entry registered on a flow table therein. When receiving an inquiry of the packet from the switch, the controller registers a flow entry which defines a rule (match condition) and an action (predetermined processing) of the packet on the flow table in the switch. The neighboring switch is connected with the switch. Here, the switch contains a first table (a monitoring table 107 in FIGS. 1 to 10, and FIGS. 13 to 15, a transfer table A106-1 in FIGS. 16 and 17) to register the inquiry entry to transfer the packet corresponding to the rule (match condition) to the controller, a second table (a transfer table 106 of FIGS. 1 to 10, and FIGS. 13 to 15, a transfer table B106-2 of FIGS. 16 and 17) to register the packet transfer entry to transfer the packet corresponding to the rule (match condition) to the neighboring switch.

The switch according to the present invention contains a first table to register the inquiry entry to transfer the packet corresponding to the rule (match condition) to the controller, a second table to register the packet transfer entry to transfer the packet corresponding to the rule (match condition) to the neighboring switch, and a transferring section which transfers the packet according to each of the inquiry entry and the packet transfer entry.

In the monitoring centralized control method of the present invention, a first table is provided in a switch as a flow table to register an inquiry entry to transfer a packet corresponding to a rule (match condition) to a controller. Also, a second table is provided in the switch as the flow table to register a packet transfer entry to transfer the packet corresponding to the rule (match condition) to the neighboring switch. Also, the switch transfers the packet according to the flow entry registered on the flow table. Also, when receiving an inquiry of the packet from the switch, the controller registers the flow entry which defines the rule (match condition) and an action (predetermined processing) of the packet on the flow table in the switch.

A program of the present invention is a program to make a switch execute the steps of: referring to a first table to register an inquiry entry to transfer a packet corresponding to a rule (match condition) to a controller; referring to a second table to register a packet transfer entry to transfer the packet corresponding to the rule (match condition) to a neighboring switch; and transferring the packet according to each of the inquiry entry and the packet transfer entry. It should be noted that the program of the present invention may be stored in a storage unit and a storage medium.

In this way, the grain degree of the monitoring can be freely changed and the monitoring result can be freely reflected on the routing control of the network.

BRIEF DESCRIPTION OF THE DRAWINGS

FIG. 10A is a sequence chart showing an operation of the switch system according to the first exemplary embodiment of the present invention;

DESCRIPTION OF EXEMPLARY EMBODIMENTS

First Exemplary Embodiment

A first exemplary embodiment of the present invention will be described below with reference to the attached drawings.

(System Configuration)

Figure 1:
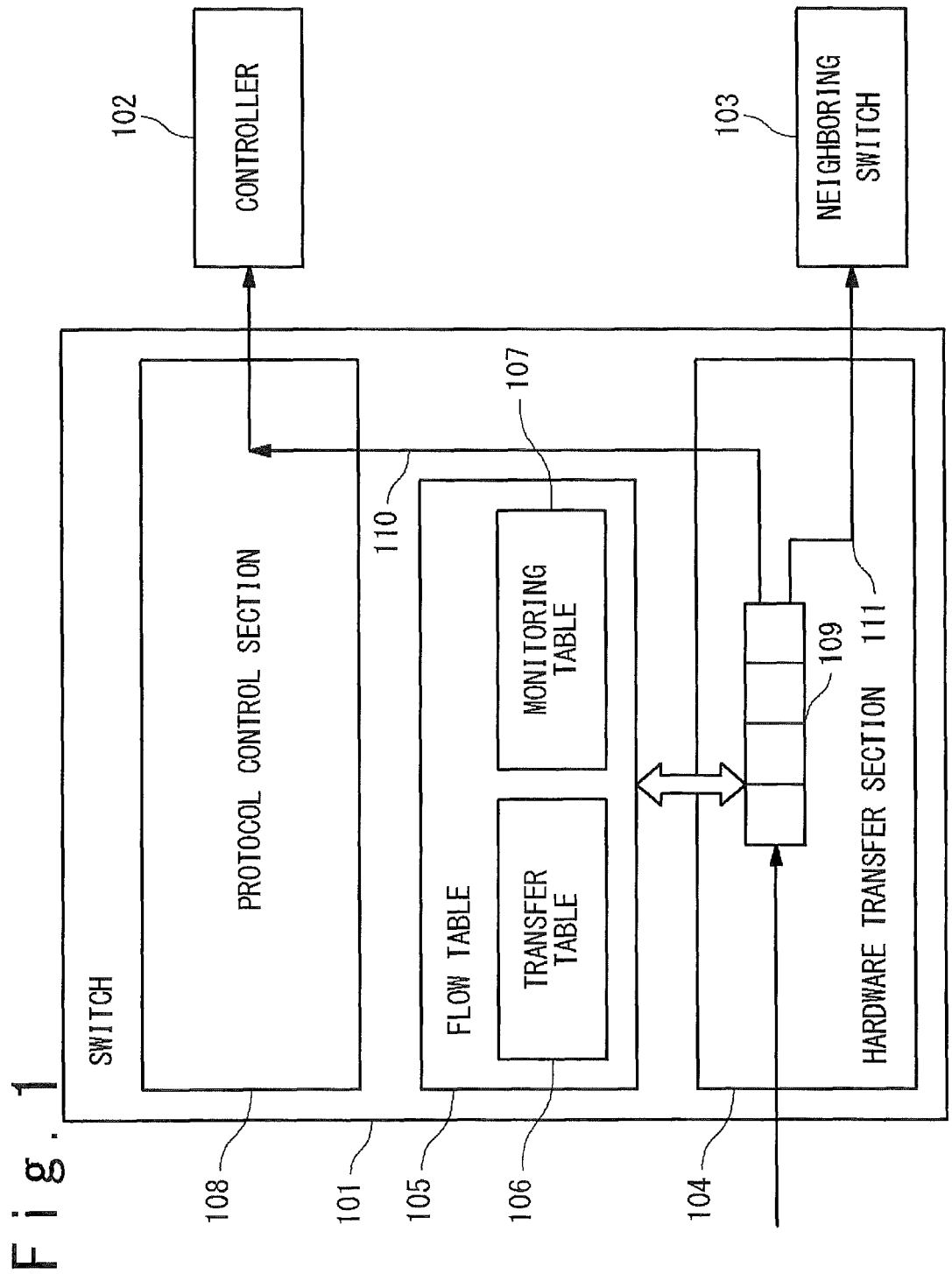
FIG. 1 is a diagram showing a configuration of a switch system according to a first exemplary embodiment of the present invention.

As shown in FIG. 1, the switch system of the first exemplary embodiment of the present invention contains a switch 101, a controller 102 and a neighboring switch 103.

The switch 101 shows the main body of the switch. It should be noted that it is supposed that the switch 101 corresponds to a control protocol (e.g. the open flow and so on) and can be changed from an external controller to perform the centralized control of a packet transfer table and a monitoring table.

The controller 102 is based on the control protocol and through the secure channel, it controls the switch 101.

The neighboring switch 103 neighbors the switch 101.
(Illustration of Hardware)

As an example of the switch 101 and the neighboring switch 103, it assumes an open flow the switch. As an example of the open flow the switch, a network switch (network the switch), a multi-layer switch and so on are thought of. The multi-layer switch is classified for every layer of the OSI Reference Model to support, being smaller. The main classification includes the layer 3 the switch which reads data on the network layer (the third layer), the layer 4 the switch which reads data on the transport layer (the fourth layer), the layer 7 the switch (the application the switch) which reads data on the application layer (the seventh layer). It should be noted that in the open flow network, a relay unit such as a general router and a switching hub can be used as an open flow the switch. Also, the switch 101 and the neighboring switch 103 may be a virtual switch built on a physical machine. Also, as a substitution example of the switch 101 and the neighboring switch 103, there are thought of a router, a proxy, a gateway, a firewall, a load balancer (load distribution device), a band control unit (packet shaper), a security monitor and control (SCADA: Supervisory Control And Data Acquisition), a gatekeeper, a base station, an access point (AP), a telecommunication satellite (CS) or a computer which has a plurality of communication ports.

As an example of the controller 102, assumption computers such as a PC (personal computer), an appliance, a work station, a mainframe, and a supercomputer. Also, the controller 102 may be the virtual machine (VM) built on the physical machine.

As an example of the network which connects the switch 101, the controller 102 and the neighboring switch 103, it assumes LAN (Local Area Network).

As another example, the Internet, a wireless LAN, a WAN (Wide Area Network), a backbone (Backbone), a community antenna television system (CATV) circuit, fixing type telephone network, the carrying telephone network, WiMAX (IEEE 802.16a), 3G (3rd Generation), a leased circuit, IrDA (Infrared Data Association), Bluetooth (the registered trademark), a serial communication circuit, a data bus and so on are exemplified.

Although not illustrating, the switch 101, the controller 102 and the neighboring switch 103 are realized by a processor which drives and executes given processing based on a program, a memory which stores the program and data of all kinds, and an interface (I/F) for the communication.

As an example of the above-mentioned processor, a CPU (Central Processing Unit), a microprocessor, a microcontroller or a semiconductor integrated circuit (IC) and so on which has the function of an exclusive use are exemplified.

As an example of the above-mentioned memory, a semiconductor memory unit such as a RAM (Random Access Memory), a ROM (Read Only Memory), such as an EEPROM (Electrically Erasable and Programmable Read Only Memory) and a flash memory, a secondary memory such as an HDD (Hard Disk Drive) and an SSD (Solid State Drive), a removable disk such as a DVD (Digital Versatile Disk), storage media such as an SD memory card (Secure Digital memory card) and so on are Exemplified. Or, storage units such as a DAS (Direct Attached Storage), an FC-SAN (Fibre Channel-Storage Area Network), a NAS (Network Attached Storage), and an IP-SAN (IP-Storage Area Network) may be used.

As an example of the above-mentioned interface for communication,

The communication ports such as the semiconductor integrated circuit of the substrate (the motherboard, the I/O board) and the chip which corresponded to the network communication and so on, the network adapter of NIC (Network Interface Card) and so on and the similar expansion card, the communication systems, the end connections (the connector) such as the antenna and so on are thought of.

But, actually, the present invention is not limited to these examples.

The switch 101 is provided with a hardware transfer section (switching section) 104, a flow table 105 and a protocol control section 108.

The hardware transfer section 104 performs a switching operation and hardware-transfers a packet received from the outside of the switch and a packet in the switch. For example, the hardware transfer is a transferring operation performed in a closed state in a switch chip without intervening the CPU.

The flow table 105 contains a transfer table 106 and a monitoring table 107.

The transfer table 106 shows a transfer flow table to register a packet transfer entry. The packet transfer entry is a flow entry to transfer a packet matching to a rule (a match condition) to a predetermined port (Port) of the switch 101 and to hardware-transfer to the neighboring switch 103 in the output destination of the port.

The monitoring table 107 shows a monitoring flow table to register a mirroring entry and a statistic entry. The mirroring entry is a flow entry to transfer (perform mirroring) the packet matching to the rule (a match condition) to the controller 102. The mirroring is to copy a packet to transfer to an optional destination, while transferring the packet which is flowing through the network in a usual way. In the network communication, one piece of received communication data can be copied and transferred to a plurality of destinations. The statistic entry is a flow entry to acquire environmental data of the packet matching to the rule (a match condition). It is possible to say that the mirroring entry and the statistic entry are a kind of inquiry entries to the controller 102.

The protocol control section 108 performs a control using an open flow (OpenFlow) technique. The protocol control section 108 transmits a packet received from the hardware transfer section 104 to the controller 102 and performs the registration and change of an entry to the flow table 105 according to the control from the controller 102.

A packet 109 shows a packet received by the switch 101.

The route 110 shows a route between the switch 101 and the controller 102. If there is any entry hit in the monitoring table 107 as a result of searching the flow table 105 for the received packet, the hardware transfer section 104 outputs the received packet to the output port connected with the route 110 according to the entry and transfers it to the controller 102 through the route 110.

The route 111 shows a route between the switch 101 and the neighboring switch 103.

If there is any entry hit in the transfer table 106 as a result of searching the flow table 105 for the reception packet, the hardware transfer section 104 outputs the received packet to the output port connected with the route 111 according to the entry and transfers it to the neighboring switch 103 through the route 111.

(Operation Upon Reception of Packet)

FIG. 1 shows an operation when receiving a packet by a switch.

The hardware transfer section 104 searches an entry which is registered on the transfer table 106 and the monitoring table 107 which belong to the flow table 105, when receiving packet 109, compares with the data of the packet 109, and executes the action (predetermined processing) written in the entry to the packet 109, when the packet 109 matches to the condition of the entry.

For example, when the hardware-transfer of a packet to the neighboring switch 103 is written as the action (predetermined processing) of the entry, the hardware transfer section 104 hardware-transfers the packet 109 to the neighboring switch 103 through the route 111.

Also, when the transfer of the packet to the controller 102 is written as the action (predetermined processing) of the entry, the hardware transfer section 104 transfers the packet the controller 102 through the route 110 and the protocol control section 108 according to the rule of the protocol prescribed between the switch 101 and the controller 102.

It should be noted that in the present invention, the hardware transfer section 104 searches the entries of each of the transfer table 106 and the monitoring table 107 based on one reception packet. When there is any entry of a condition to match with both tables, it is supposed that a "multi-hit operation" is executed to implement the action (predetermined processing) written in both the entries at the same time.

For example, when the entry which matches with one packet 109 is in both of the transfer table 106 and the monitoring table 107, and "the hardware transfer to the neighboring switch 103" is written in the action (predetermined processing) of the entry of the transfer table 106 and "the transfer to the controller 102 (mirroring)" is written in the action (the predetermined processing) of the monitoring table 107, the hardware transfer section 104 hardware-transfers to the neighboring switch 103 through the route 111 and at the same time, transfers (performs mirroring) to the controller 102 through the route 110, if receiving a packet 109.

(Registration of Entry on Flow Table)

Figure 2:
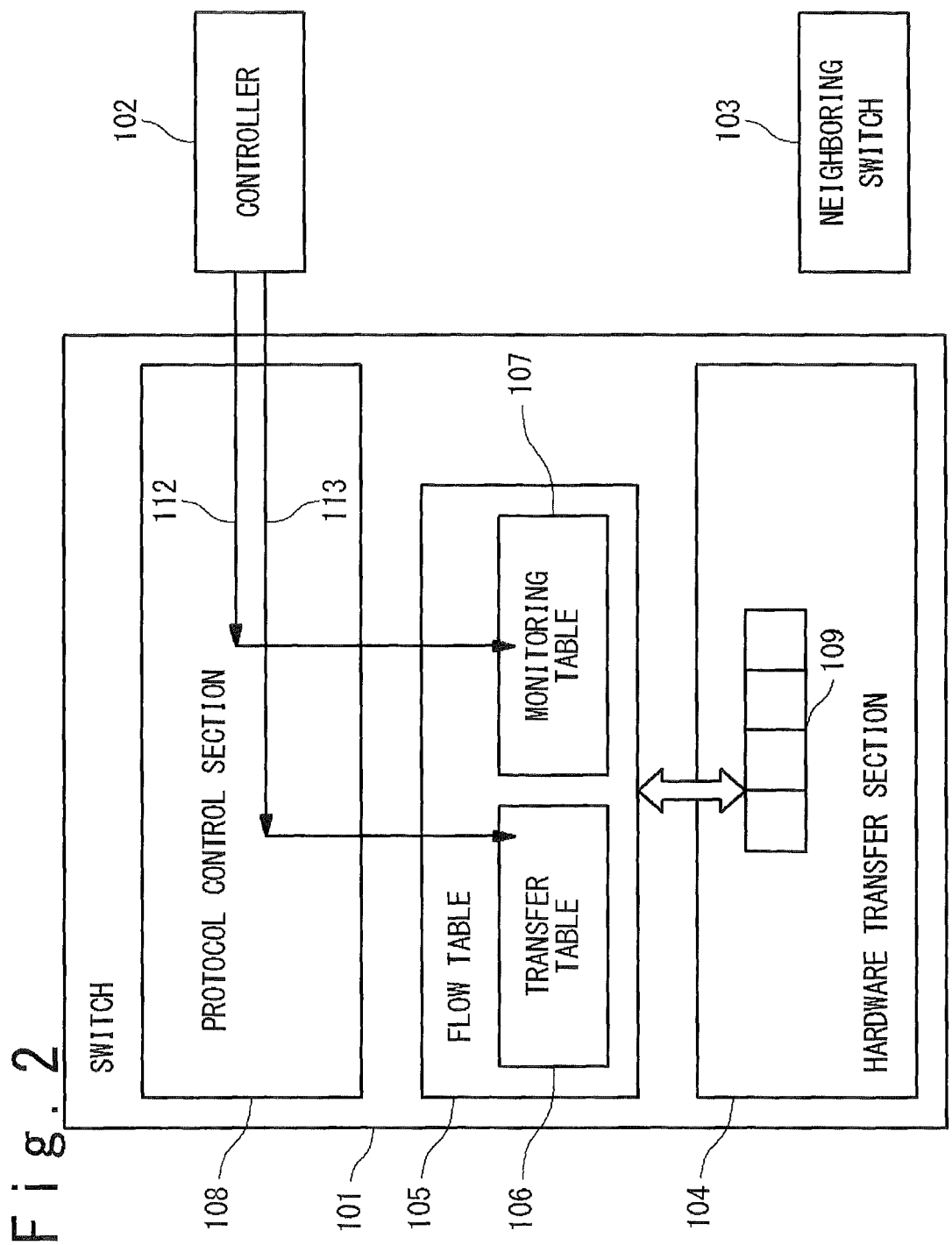
FIG. 2 is a diagram showing a flow of control when an entry is registered on a flow table in the first exemplary embodiment of the present invention.

Referring to FIG. 2, a case where an entry is registered on the flow table of the switch from the controller will be described.

Entry registration 112 shows a control flow (data flow) in which a mirroring entry and a statistic entry are registered on the monitoring table 107.

Entry registration 113 shows the flow of the control (the data) when registering the packet transfer entry on the transfer table 106.

When the mirroring entry and the statistic entry are registered on the monitoring table 107 from the controller 102, an entry registration request is issued from the controller 102 by using a protocol message between the controller 102 and the protocol control section 108 in the switch 101 according to a protocol, like the entry registration 112. When the protocol control section 108 receives the entry registration request from the controller 102, and registers the mirroring entry and the statistic entry on the monitoring table 107 according to the content of the entry registration request.

When the packet transfer entry is registered on the transfer table 106 from the controller 102, the entry registration request is issued from the controller 102 by using the protocol message according to the protocol prescribed between the controller 102 and the protocol control section 108 in the switch 101, the like entry registration 113. When the protocol control section 108 receives the entry registration request from the controller 102, and registers the packet transfer entry on the transfer table 106 according to the content of the entry registration request.

(Acquisition of Statistic Data)

Figure 3:
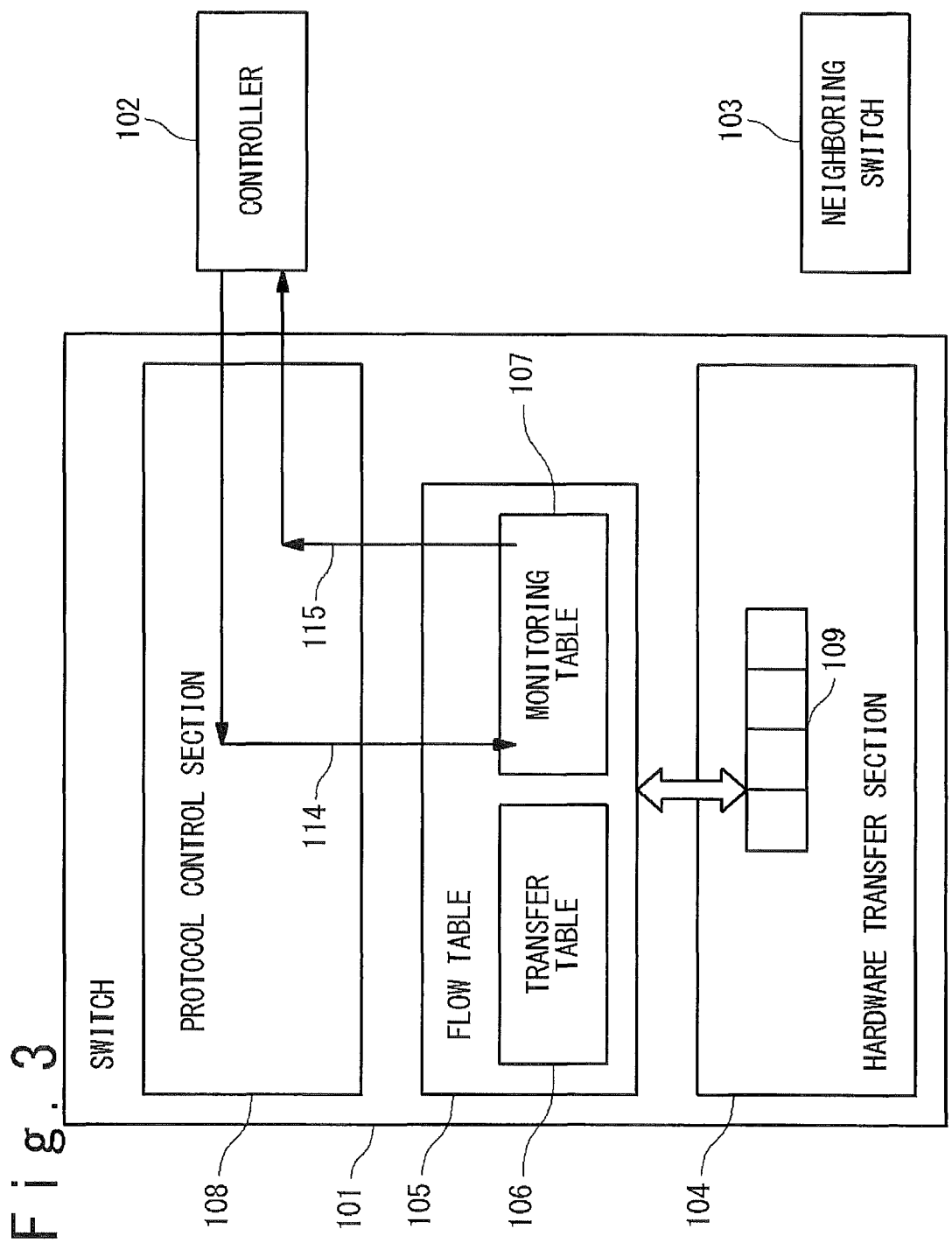
FIG. 3 is a diagram showing a flow of control when statistic data is acquired in the first exemplary embodiment of the present invention.

Referring to FIG. 3, a case where the statistic data of the switch is acquired from the controller will be described.

A statistic data acquisition request 114 shows a request control flow (data flow) to acquire the statistic data.

A statistic data response 115 shows a control flow (data flow) which sends the statistic data to the controller 102.

When requesting the acquisition of the statistic data from the controller 102 to the switch 101, the statistic data acquisition request is issued from the controller 102 by using the protocol message according to the protocol prescribed between the controller 102 and the protocol control section 108 in the switch 101, like statistic data acquisition request 114. When receiving the statistic data acquisition request from the controller 102, the protocol control section 108 performs the statistic data acquisition to the monitoring table 107. Here, the protocol control section 108 collects the statistic data of packets which hits (adapts to) the statistic entry and accumulates to the monitoring table 107.

When responding to the statistic data acquired from the switch 101 by the controller 102, the monitoring table 107 receives the statistic data acquisition request 114 and responds to the protocol control section 108 in the statistic data, like statistic data response 115. The protocol control section 108 replies the acquired statistic data to the controller 102 by use of the statistic data response 115 by using the protocol message according to a protocol.

(System Viewpoint of Network)

FIGS. 4 to 9 show a control flow (data flow) in the first exemplary embodiment of the present invention in the system viewpoint of the network.

In this exemplary embodiment, it is supposed that the centralized control type network conforms to the control protocol (e.g. the open flow and so on) and that the transfer table of the packet of the switch is changed from the controller.

It should be noted that the switch 101 and the controller 102 are the same as those of FIG. 1.

(Packet Transfer)

Figure 4:
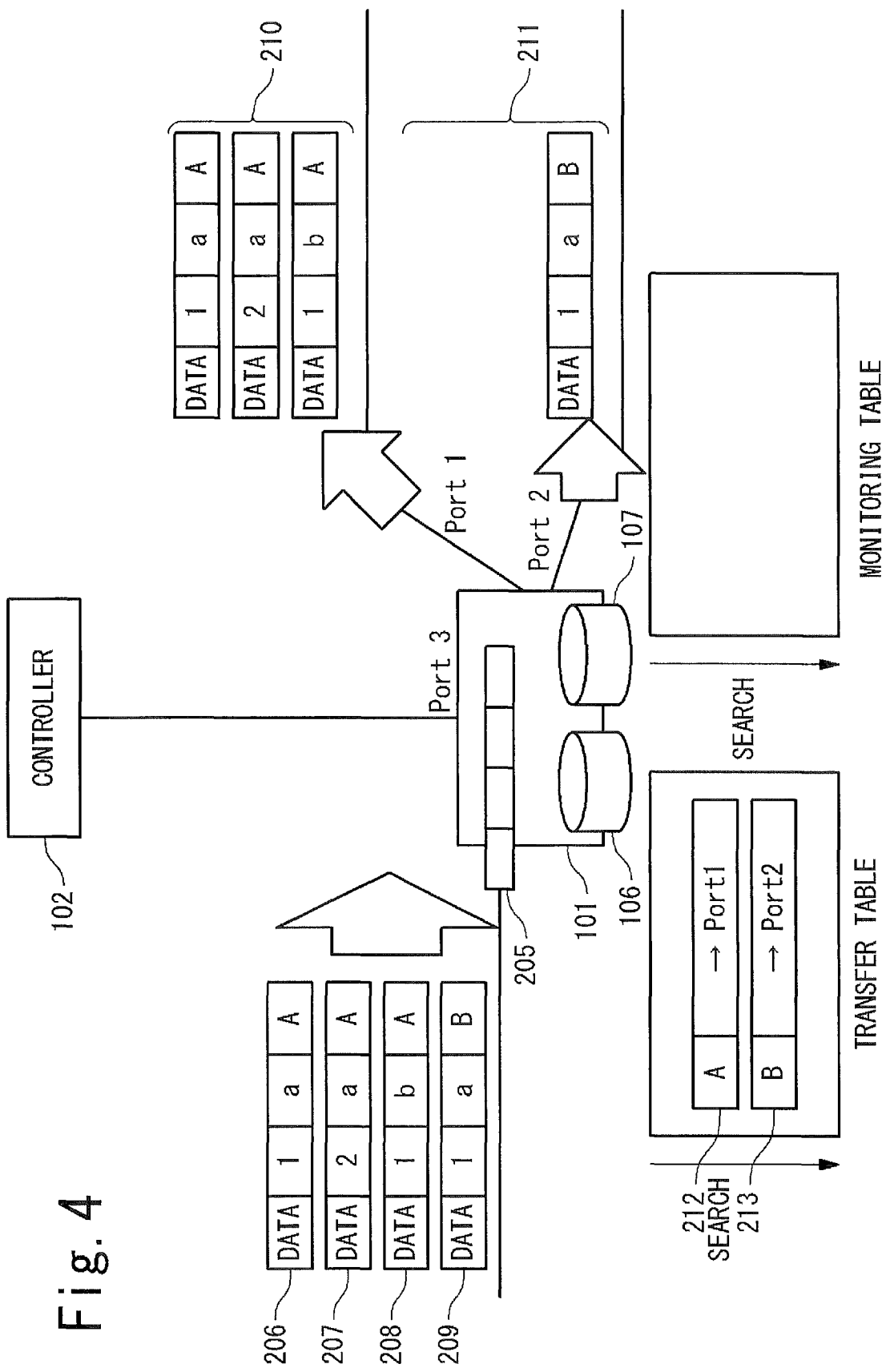
FIG. 4 is a diagram showing a flow of control in case of packet transfer according to a transfer table in the first exemplary embodiment of the present invention.

Referring to FIG. 4, an example of the packet transfer according to the transfer table will be described.

A packet 205 shows a packet received by the switch 101. It should be noted that packet 205 is equivalent to the packet 109 of FIG. 1.

A packet 206 shows a packet which contains "A", "a", "1", and "DATA" as the internal configuration.

A packet 207 shows a packet which contains "A", "a", "2", and "DATA" as the internal configuration.

A packet 208 shows a packet which contains "A", "b", "1", and "DATA" as the internal configuration.

A packet 209 shows a packet which contains "B", "a", "1", and "DATA" as the internal configuration.

A packet group 210 shows a packet group outputted from "Port1" as one of the ports of the switch 101. Here, the packet group 210 contains a packet 206, a packet 207 and a packet 208.

A packet group 211 shows a packet group outputted from "Port2" as one of the ports of the switch 101. Here, the packet group 211 contains a packet 209.

An entry 212 is one of the packet transfer entries which are registered on the transfer table 106 and shows a packet transfer entry to transfer "the packet which contains "A"" to "Port1".

An entry 213 is one of the packet transfer entries which are registered on the transfer table 106 and shows a packet transfer entry to transfer "the packet which contains "B"" to "Port2".

FIG. 4 shows a normal condition in that there is no entry in the monitoring table 107, and an entry 212 and an entry 213 are already registered on the transfer table 106 and only the packet transfer is performed.

As a packet which has a possibility that the switch 101 receives, there are a packet 206, a packet 207, a packet 208, and a packet 209 according to the internal configuration of the packet.

The hardware transfer section 104 in the switch 101 outputs the packet 206, the packet 207, the packet 208 from "Port1" as a packet group 210 according to a packet transfer entry (entry 212) which is one of the packet transfer entries registered on the transfer table 106 and which is for transferring "the packet which contains "A"" to "Port1".

Also, the hardware transfer section 104 in the switch 101 outputs the packet 209 from "Port2" as a packet group 211 according to a packet transfer entry (entry 213) which is one of the packet transfer entries registered on the transfer table 106 and which is for transferring "the packet which contains "B"" to "Port2".

(Registration of Mirroring Entry on Monitoring Table)

Figure 5:
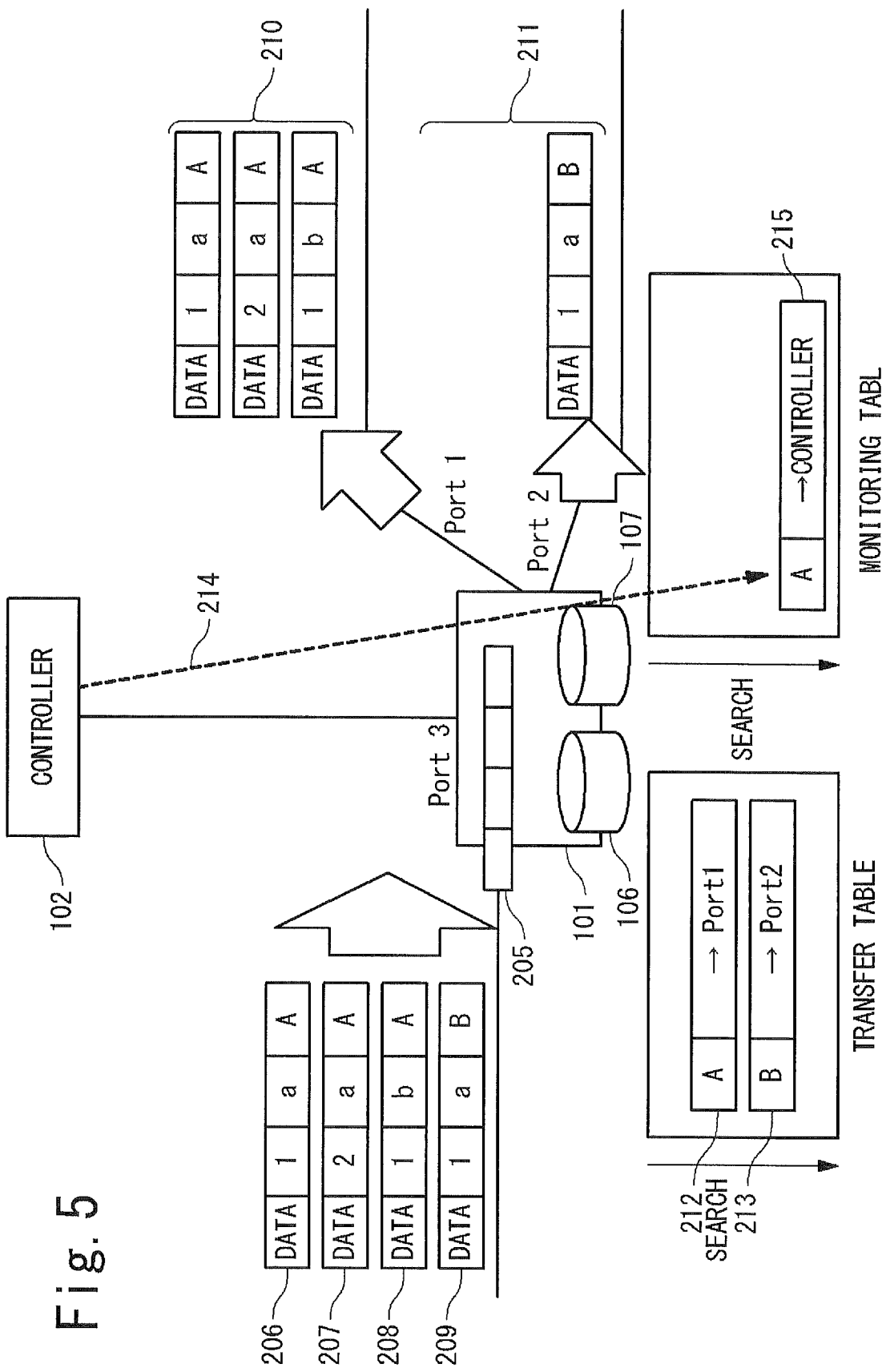
FIG. 5 is a diagram showing a flow of control in case of registration of a mirroring entry on a monitoring table in the first exemplary embodiment of the present invention.

Referring to FIG. 5, an example of the registration of mirroring entry on the monitoring table will be described.

The entry registration 214 shows a control flow (a data flow) in case of registration of the mirroring entry on the monitoring table 107 of the switch 101 from the controller 102 through a secure channel based on a control protocol.

The entry 215 shows one of the monitoring entries registered on the monitoring table 107, and is the mirroring entry to transfer (perform the mirroring) "the packet which contains "A"" to the controller 102.

For example, when congestion occurs at the destination from "Port1" in the condition of FIG. 4, the communication contained in a packet transfer entry 212 is analyzed and it does the registration of the mirroring entry shown in FIG. 5 is performed when a cause is to be specified.

First, as shown in the entry registration 214, the entry 215 is registered for transferring (performing the mirroring) "the packet which contains "A" from the controller 102 to the monitoring table 107 of the switch 101.

Here, the controller 102 transmits a protocol message to the protocol control section 108 in the switch 101 according to a protocol and request an entry registration.

When receiving the entry registration request from the controller 102, the protocol control section 108 registers the mirroring entry 215 on the monitoring table 107 according to the contents of the entry registration request.

It should be noted that because performing the control of a transfer table 212, the controller 102 can select a condition of the entry 215.

(Inquiry to Controller)

Figure 6:
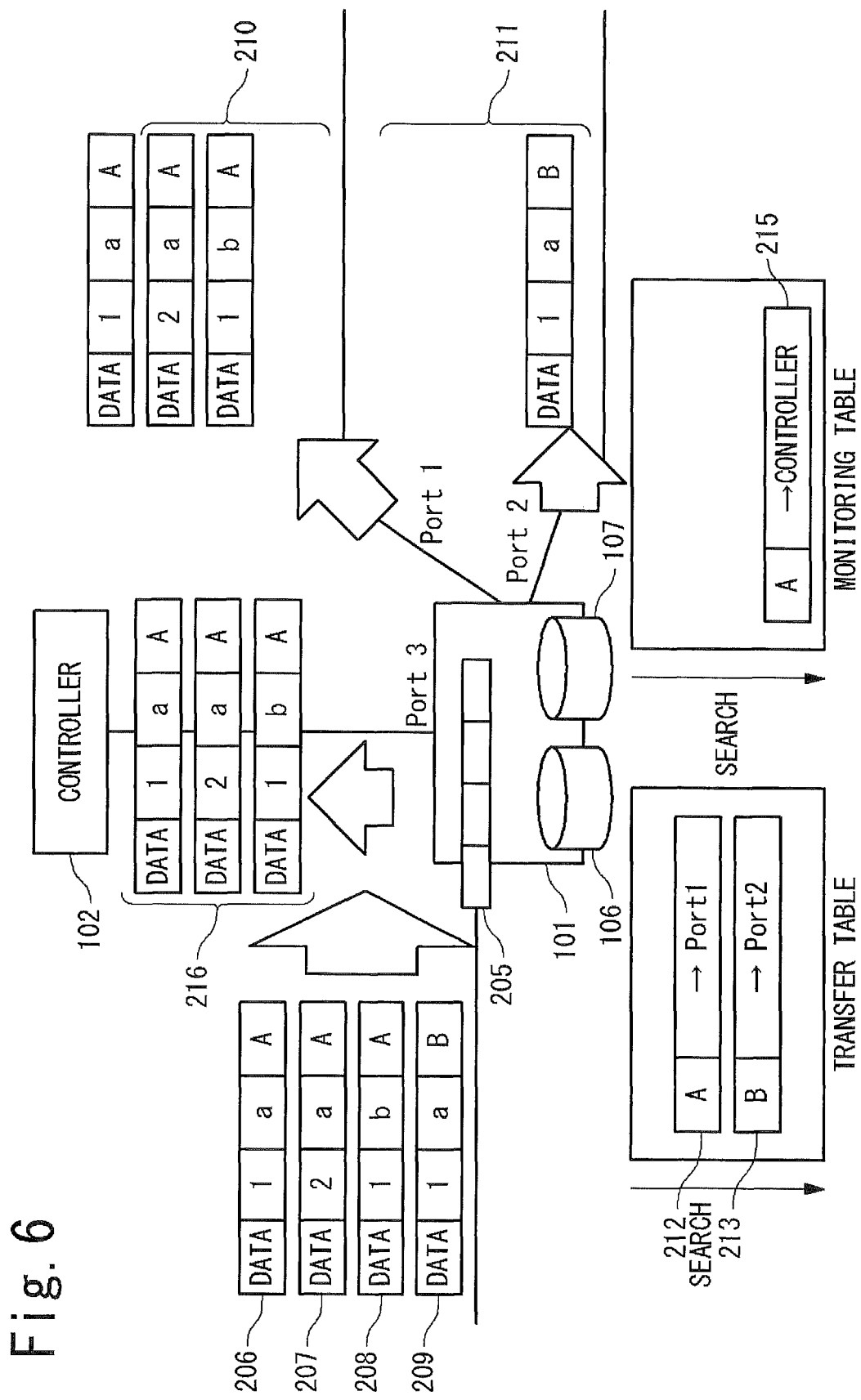
FIG. 6 is a diagram showing a flow of control in case of an inquiry to the controller in the first exemplary embodiment of the present invention.

Referring to FIG. 6, an example of the processing in which an inquiry to the controller is performed will be described about an unknown packet which does not hit any existing entry.

A packet 216 shows a packet (a mirror packet) which is transferred to the controller 102 from the switch 101.

The protocol control section 108 in the switch 101 transmits "the packet which contains "A"" to the controller 102 as a mirror packet, like the packet 216 of FIG. 6, according to the entry 215 registered on the monitoring table 107 in FIG. 5.

It should be noted that in the hardware transfer section 104 of the switch 101, the mirroring of packet 216 is possible in the condition that usual transfer processing (packet group 210, packet group 211) is continued just as it is, in order to perform a multi-hit operation of the transfer table 106 and the monitoring table 107.

Also, through the mirroring, the controller 102 can recognize that a packet 206, a packet 207, and a packet 208 exist in the packet group 210 which is transferred to "Port1".

(Statistic Entry Registration on Monitoring Table)

Figure 7:
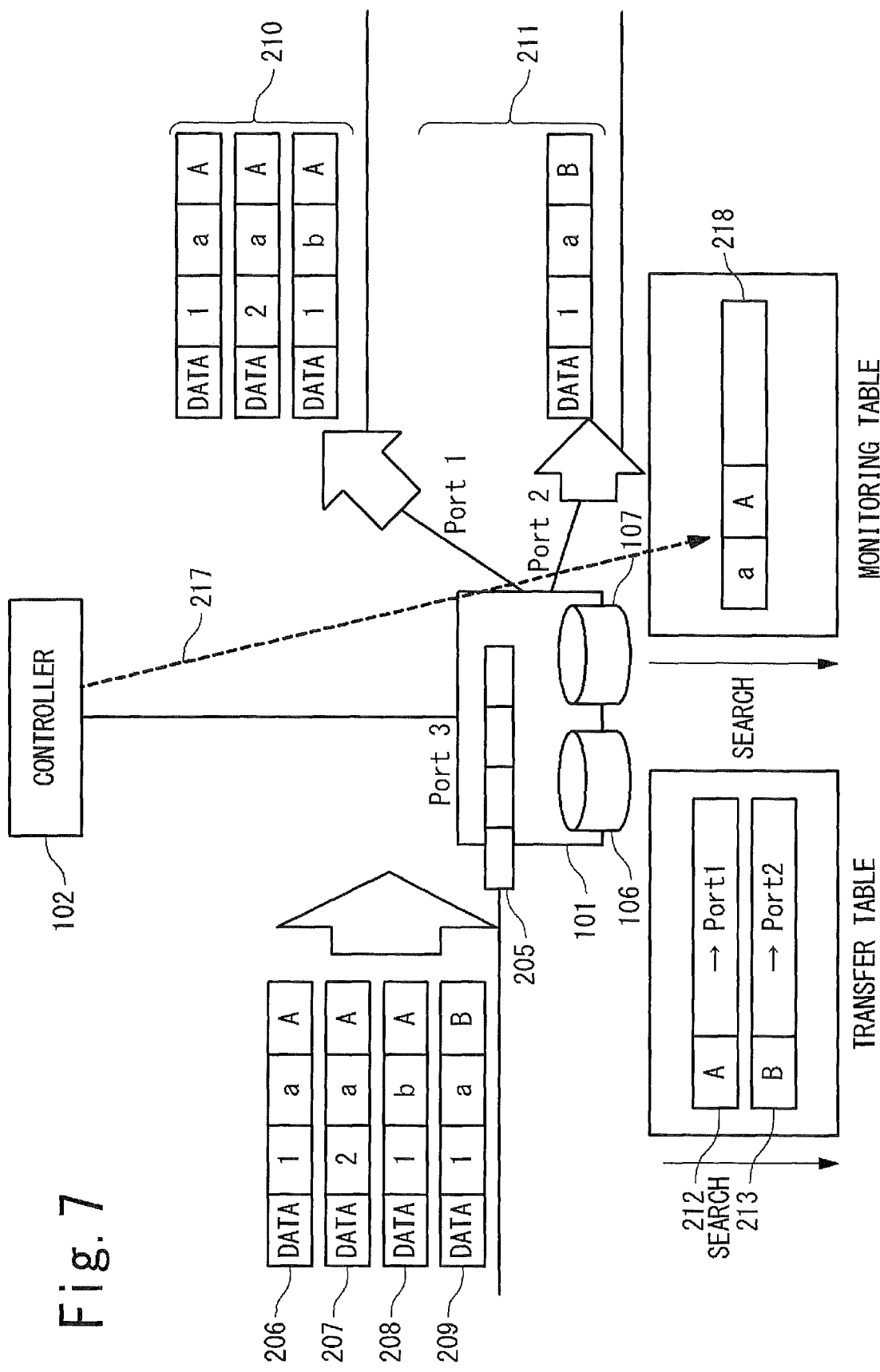
FIG. 7 is a diagram showing a flow of control in case of registration of a statistic entry on the monitoring table in the first exemplary embodiment of the present invention.

Referring to FIG. 7, an example of registration of a statistics entry on the monitoring table will be described.

The entry registration 217 shows a control flow of (a data flow) when the statistic entry is registered on the monitoring table 107 of the switch 101 from the controller 102 through the secure channel based on the control protocol.

The entry 218 is one of the monitoring entries having registered on the monitoring table 107 and shows a statistic entry which hits "the packet which contains "A"".

The controller 102 receives the monitoring result (the mirror packet) of FIG. 6, and registers on the monitoring table 107, a statistic data collection entry 218 with the condition of "the packet which contains "A" and "a"" which has a finer grain size than that of "the packet which contains "A"", like entry registration 217 in FIG. 7.

Here, the controller 102 transmits a protocol message to the protocol control section 108 of the switch 101 according to a protocol and requests the entry registration.

When receiving the entry registration request from the controller 102, the protocol control section 108 registers the statistic data collection entry 218 on the monitoring table 107 according to the contents of the entry registration request.

(Notice of Statistic Data to Controller)

Figure 8:
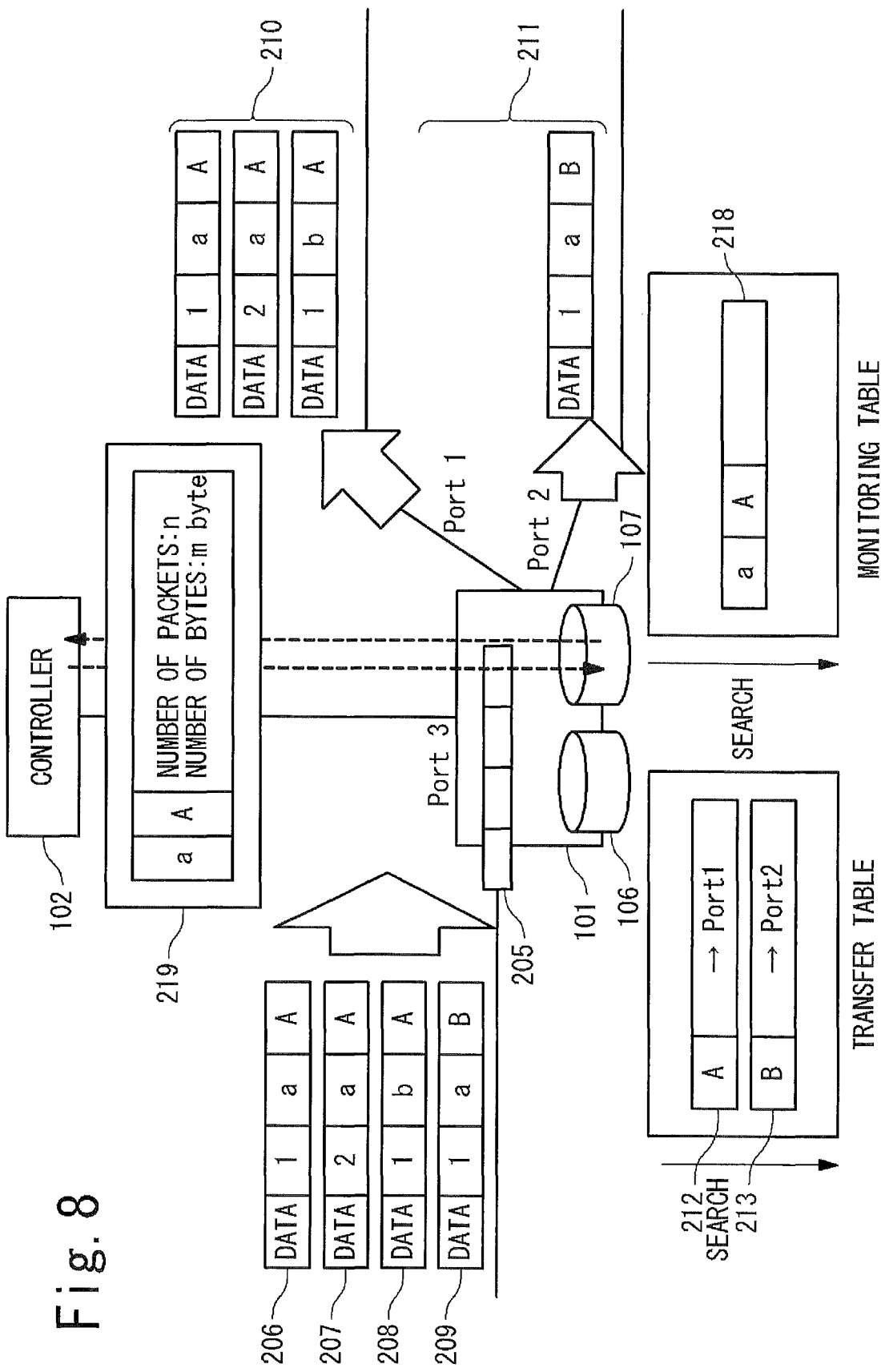
FIG. 8 is a diagram showing a flow of control in case of a notice of the statistic data to the controller in the first exemplary embodiment of the present invention.

Referring to FIG. 8, an example of the notice of the statistic data to the controller will be described.

The statistic data 219 shows statistic data sent from the switch 101 to the controller 102.

The switch 101 acquires the statistic data as shown in FIG. 8 to a packet which hits the entry 218 registered in FIG. 7. The switch 101 transmits the statistic data 219 of the packet which hits the entry 218, to the controller 102.

(Packet Transfer Entry Registration on Transfer Table)

Figure 9:
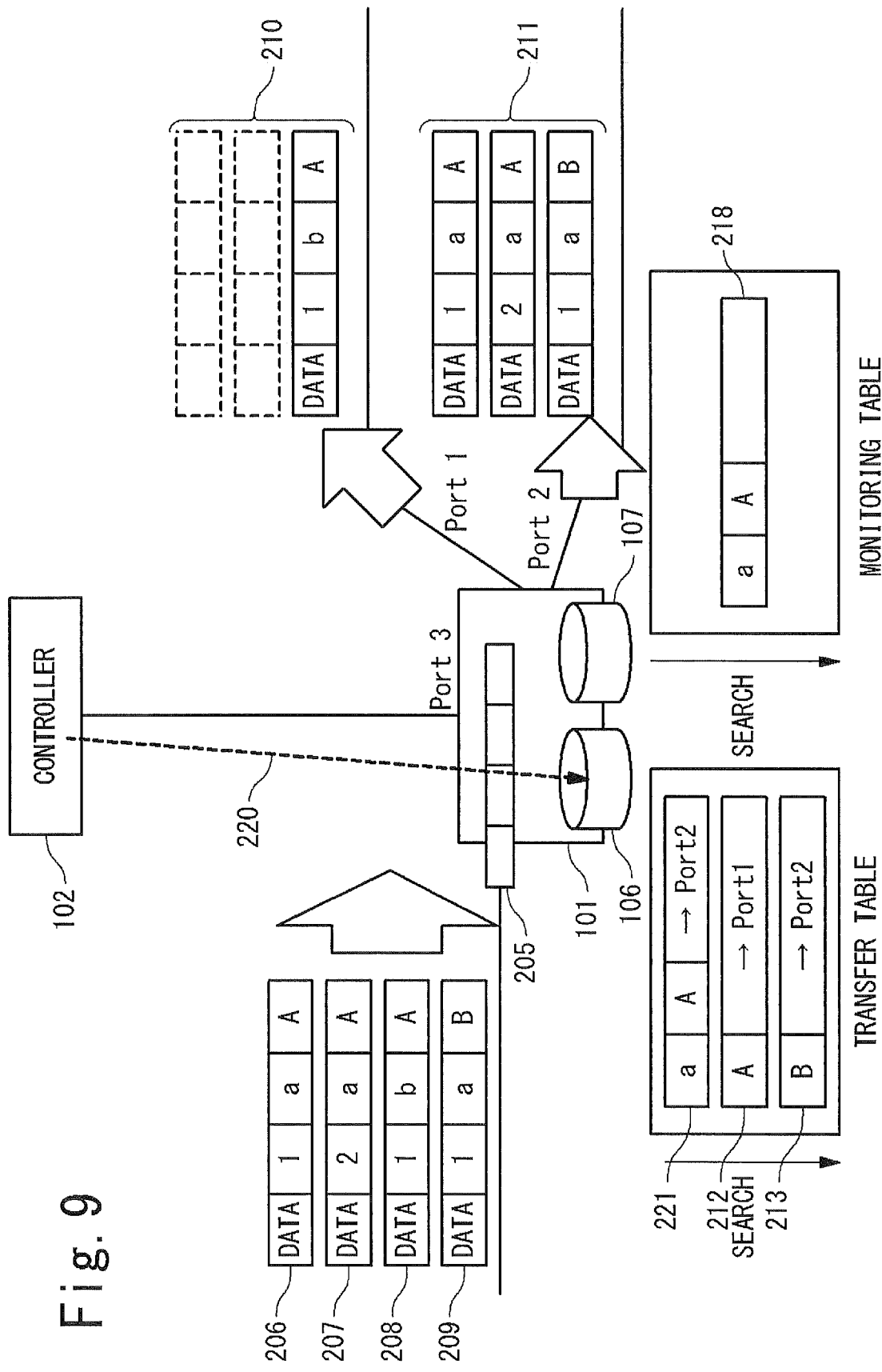
FIG. 9 is a diagram showing a flow of control in case of registration of a packet transfer entry on a transfer table in the first exemplary embodiment of the present invention.

Referring to FIG. 9, an example of the packet transfer entry registration on the transfer table based on the statistic data will be described.

The packet group 210 shows a packet group outputted from "Port1" of the switch 101. Here, the packet group 210 contains packet 208.

The packet group 211 shows a packet group outputted from "Port2" of the switch 101. Here, the packet group 211 contains the packet 206, the packet 207 and the packet 209.

The entry registration 220 shows a control flow (a data flow) when the packet transfer entry is registered on the transfer table 106 of the switch 101 from the controller 102 through the secure channel based on the control protocol.

The entry 221 is one of the packet transfer entries which have been registered on the transfer table 106 and shows the packet transfer entry for transferring "the packet which contains "A", "a"" to "Port2".

Based on the collection result of the statistic data of FIG. 8, the controller 102 registers on the transfer table, the entry 221 of transferring "the packet which contains "A", "a"" to "Port2", like the entry registration 220, and changes "the packet which contains "A", "a"" into the packet group 211 transmitted from "Port2".

Here, the controller 102 transmits the protocol message to the protocol control section 108 in the switch 101 according to the prescribed protocol prescribed, to request the entry registration.

When receiving the entry registration request from the controller 102, the protocol control section 108 registers the packet transfer entry 221 on the transfer table 106 according to the contents of the entry registration request.

The hardware transfer section 104 of the switch 101 adds the packet 206 and the packet 207 which are "the packet which contains "A", "a"", to packet group 211 to output from "Port2", according to the entry 221 which has been registered on the transfer table 106. In this case, the hardware transfer section 104 outputs the packet 208 from "Port1" as the packet group 210 and outputs the packet 206, the packet 207, and the packet 209 from "Port2" as the packet group 211.

In this way, in this exemplary embodiment, because the controller performs the centralized control on monitor processing, the monitoring result can be reflected on the routing control of the switch.

(Operation Sequence)

Figure 10B:
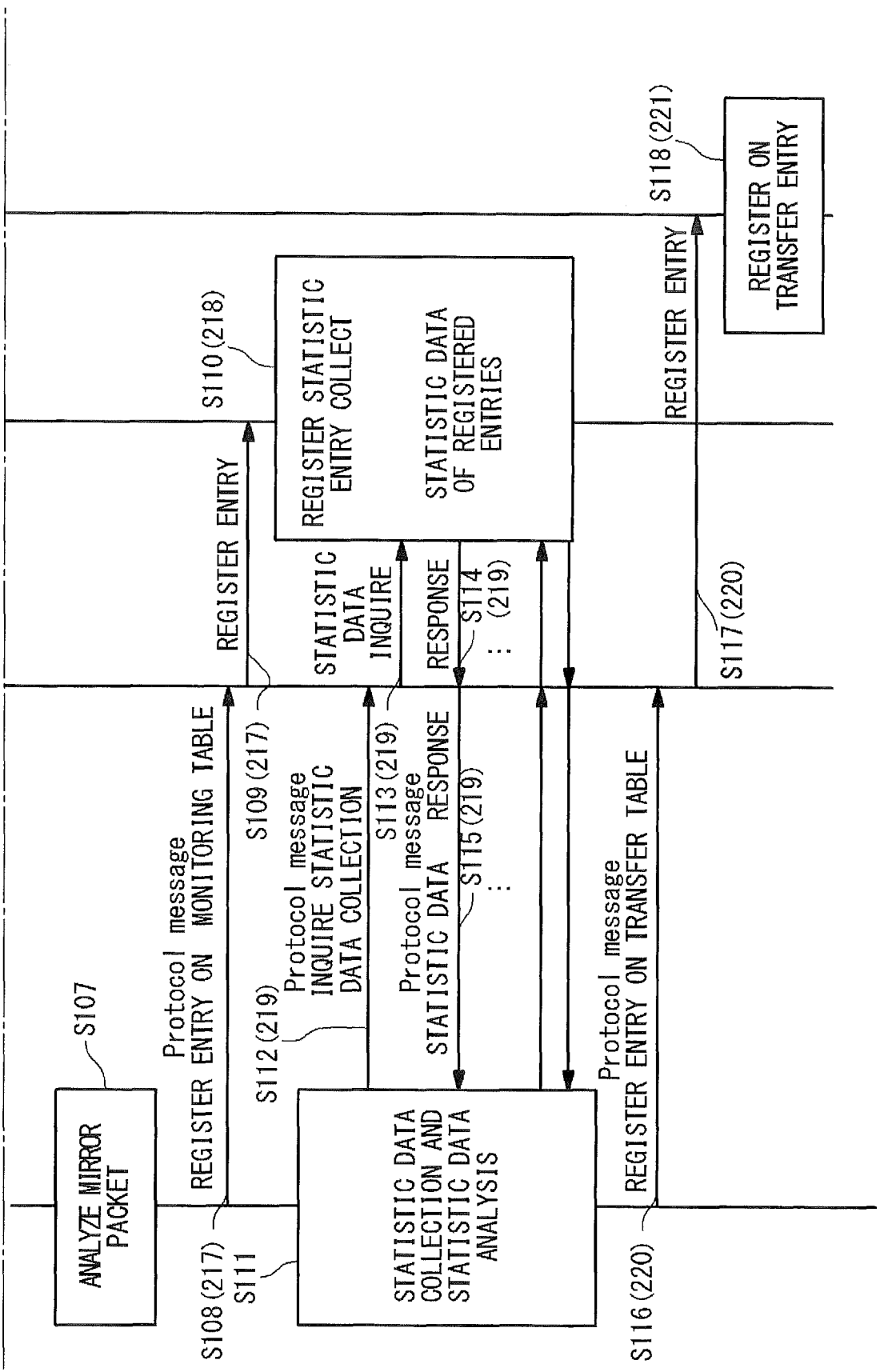
FIG. 10B is a sequence chart showing the operation of the switch system according to the first exemplary embodiment of the present invention.

Referring to FIG. 10A and FIG. 10B, a sequence showing an operation of the switch system in the first exemplary embodiment of the present invention will be described.

It should be noted that the switch 101 and the controller 102 are same as those in FIG. 1.

(1) Step S101

The controller 102 transmits a registration request of the mirroring entry to the switch 101 by using of a "protocol message" which is based on the control protocol (open flow protocol) in the open flow technique. The protocol control section 108 of the switch 101 receives the registration request of the mirroring entry from the controller 102 by use of the "protocol message". This processing flow is contained in the entry registration 214 in FIG. 5.

(2) Step S102

The protocol control section 108 registers the mirroring entry on the monitoring table 107 according to the registration request of the mirroring entry. That is, the controller 102 performs the control of registering the mirroring entry on the monitoring table 107 through the protocol control section 108. This processing flow is contained in the entry registration 214 in FIG. 5.

(3) Step S103

The protocol control section 108 completes the registration of the mirroring entry (the entry 215 of FIG. 5) on the monitoring table 107. The hardware transfer section 104 of the switch 101 starts a mirroring from the time when the registration of the mirroring entry is completed.

(4) Step S104

When receiving a packet from outside the switch 101, the hardware transfer section 104 confirms whether or not the reception packet hits the mirroring entry registered on the monitoring table 107. It should be noted that actually, similar processing is applied to the packet generated in the switch.

(5) Step S105

When the reception packet hits one mirroring entry which has been registered on the monitoring table 107, the hardware transfer section 104 transfers the packet (the packet 216 of FIG. 6) to the protocol control section 108, in order to perform a mirroring for the controller 102.

(6) Step S106

The protocol control section 108 transmits a mirror packet (the packet 216 of FIG. 6) to the controller 102 by use of "protocol message" to perform the mirroring.

(7) Step S107

The controller 102 analyzes the mirror packet sent from the switch 101.

(8) Step S108

The controller 102 transmits a statistic entry registration request to the switch 101 by using "protocol message" based on the analyzing result of the mirror packet. The protocol control section 108 in the switch 101 receives the statistic entry registration request from the controller 102 by using the "protocol message". This processing flow is contained in the entry registration 217 of FIG. 7.

(9) Step S109

The protocol control section 108 registers the statistic entry on the monitoring table 107 in response to the statistic entry registration request. That is, the controller 102 controls the registration of the statistic entry on the monitoring table 107 through the protocol control section 108. This processing flow is contained in entry registration 217 of FIG. 7.

(10) Step S110

The monitoring table 107 receives the entry registration processing and registers the statistic entry (entry 218 of FIG. 7). The hardware transfer section 104 starts the collection of statistic data about the packet corresponding to the statistic entry from the time at which the registration of the statistic entry is completed. The hardware transfer section 104 collects the statistic data of the corresponding entries in the switch 101 by confirming whether or not a reception packet hits one statistic entry registered on the monitoring table 107 when receiving the packet from outside the switch 101, and accumulates it to the monitoring table 107.

(11) Step S111

The controller 102 starts an inquiry of the statistic data to the switch 101 and statistic analysis processing.

(12) Step S112

The controller 102 inquires the statistic data to the switch 101 by using the "protocol message" in order to collect the statistic data.

(13) Step S113

The protocol control section 108 inquires the statistic data collected by the switch 101 to the monitoring table 107 in response to the "protocol message" from the controller 102.

(14) Step S114

The protocol control section 108 acquires the result of the statistic data as a response from the monitoring table 107.

(15) Step S115

The protocol control section 108 transmits the result of the statistic data to the controller 102 by using the "protocol message". The controller 102 performs statistic analysis based on the result of the statistic data.

(16) Step S116

The controller 102 transmits a packet transfer entry registration request to the switch by using the "protocol message" 101 when a result of the statistic analysis needs to be fed back into the routing control of the network. Thus, the controller 102 changes the route of the switch 101. The protocol control section 108 in the switch 101 receives a packet transfer entry registration request from the controller 102 by using the "protocol message". This processing flow is contained in an entry registration 220 of FIG. 9.

(17) Step S117

The protocol control section 108 registers the packet transfer entry on the transfer table 106 in response to the packet transfer entry registration request. That is, the controller 102 controls the registration of the packet transfer entry on the transfer table 106 through the protocol control section 108. This processing flow is contained in entry registration 220 of FIG. 9.

(18) Step S118

The transfer table 106 receives entry registration processing and registers the packet transfer entry (the entry 221 of FIG. 9. The hardware transfer section 104 starts an action (predetermined processing) written in the entry to the reception packet corresponding to the entry from the time at which the registration of the packet transfer entry is completed.

In this exemplary embodiment, it is assumed that the "protocol message" based on the open flow protocol is used, but actually, a method of mirroring to the controller is not limited to it. For example, a destination is specified by the setting data (Configuration) and it is thought of that a method of mirroring to the controller by using the existing technique such as encapsulation through GRE (Generic Routing Encapsulation) and transfer of the packet.

(Feature of this Exemplary Embodiment)

As described above, in the switch system of the present exemplary embodiment, because the monitoring function and the routing control of a network are realized by using the control protocol of a communication device, the centralized control of the monitoring is realized as the whole network and the monitoring result can be reflected on the routing control.

Also, in the switch system of this exemplary embodiment, a flow table for the transfer and a flow table for the monitoring are prepared in the switch system. By searching both of the tables based on one packet and performing the multi-hit operation to implement the operation registered on the entries, the grain of the monitoring can be freely changed without being conscious of the routing control.

Second Exemplary Embodiment

As the second exemplary embodiment of the present invention, the basic configuration is same as the first exemplary embodiment, but the method of the routing control is further modified. The configuration will be described with reference to FIGS. 11 to 15.

FIGS. 11 to 14 show a flow of control (data) according to the second exemplary embodiment of the present invention in the viewpoint of the network system.

It should be noted that the switch 101 and the controller 102 are same as those of FIG. 1. The packet 205 to the entry 221 are same as those of FIGS. 4 to 9.

Also, the basic operation of the switch system in this exemplary embodiment is same as that of the first exemplary embodiment, and therefore, the description is omitted.

First, with reference to FIGS. 11 and 12, an operation when there is not a monitoring table in which the multi-hit operation is possible upon the search of the transfer table, will be described.

(Upon Packet Transfer)

Figure 11:
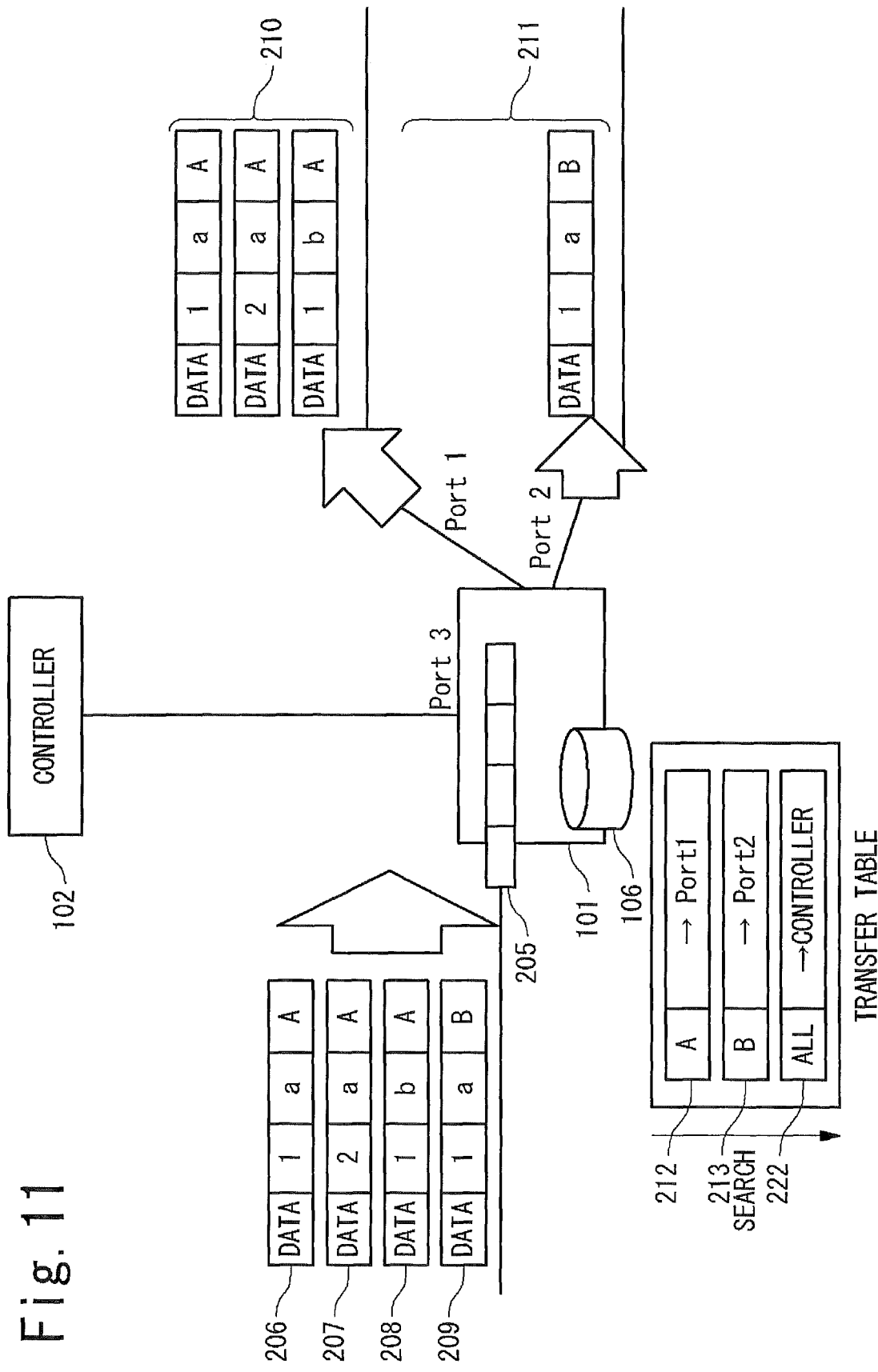
FIG. 11 is a diagram showing a flow of control in the packet transfer when the monitoring table does not exist in a second exemplary embodiment of the present invention.

Referring to FIG. 11, the flow of control (data) upon the packet transfer when the monitoring table does not exist will be described.

Here, the monitoring table 107 does not exist in the switch 101 and only the transfer table 106 exists. It should be noted that the condition where the monitoring table 107 does not exist may be the condition that any entry corresponding to the reception packet has not registered on the monitoring table 107.

The packet 205 shows a packet received by the switch 101.

The packet 206 shows a packet which contains "A", "a", "1", "DATA" as the internal configuration.

The packet 207 shows a packet which contains "A", "a", "2", "DATA" as the internal configuration.

The packet 208 shows a packet which contains "A", "b", "1", "DATA" as the internal configuration.

The packet 209 shows a packet which contains "B", "a", "1", "DATA" as the internal configuration.

The packet group 210 shows a packet group outputted from "Port1" of the switch 101. The packet group 210 contains the packet 206, the packet 207 and the packet 208.

The packet group 211 shows a packet group outputted from "Port2" of the switch 101. The packet group 211 contains the packet 209.

The entry 212 is one of the packet transfer entries registered on the transfer table 106 and shows a packet transfer entry to transfer "the packet which contains "A"" to "Port1".

The entry 213 is one of the packet transfer entries registered on the transfer table 106 and shows a packet transfer entry to transfer "the packet which contains "B"" to "Port2".

The entry 222 is one of the packet transfer entries registered on the transfer table 106 and shows a transfer default entry to transfer all of packets to the controller 102 (unconditionally). The entry 222 (the transfer default entry) is an entry for inquiry to the controller 102.

When using a control protocol about the open flow technique and so on and doing a routing control, a packet which is not hit any entry of the transfer table 106 is transferred from the switch 101 to the controller 102, and analyzed in the controller 102, and then the packet transfer entries 212 and 213 are registered on the transfer table 106 based on the analysis result as shown in FIG. 11, so that the hardware transfer becomes possible in the switch 101.

As shown in FIG. 11, when there is a packet transfer entry in the transfer table 106 other than the packet transfer entry (entry 222) to transfer all of packets to the controller, like the entry 212 or the entry 213, the entry (the entry 212 or the packet transfer entry 213 in this case) other than the entry 222 is primarily used.

That is, the hardware transfer section 104 in the switch 101 adopts an action (predetermined processing) written in the packet transfer except entry (entry 212 or entry 213) other than the entry 222, when a reception packet Hit to both of the entry 222 and the packet transfer entry (entry 212 or entry 213) other than the entry 222.

It should be noted that the packet transfer entry (entry 212 or entry 213) other than the entry 222 may be registered on a higher level than that of the entry 222 (the entry 222 is registered on the lowest level), when the entries are registered on the transfer table 106. The hardware transfer section 104 ends a search operation when a reception packet hits one packet transfer entry (entry 212 or entry 213) other than the entry 222 earlier, and starts the action (the predetermined processing) written in the packet transfer entry for the reception packet.

(Upon Start of Switch)

Figure 12:
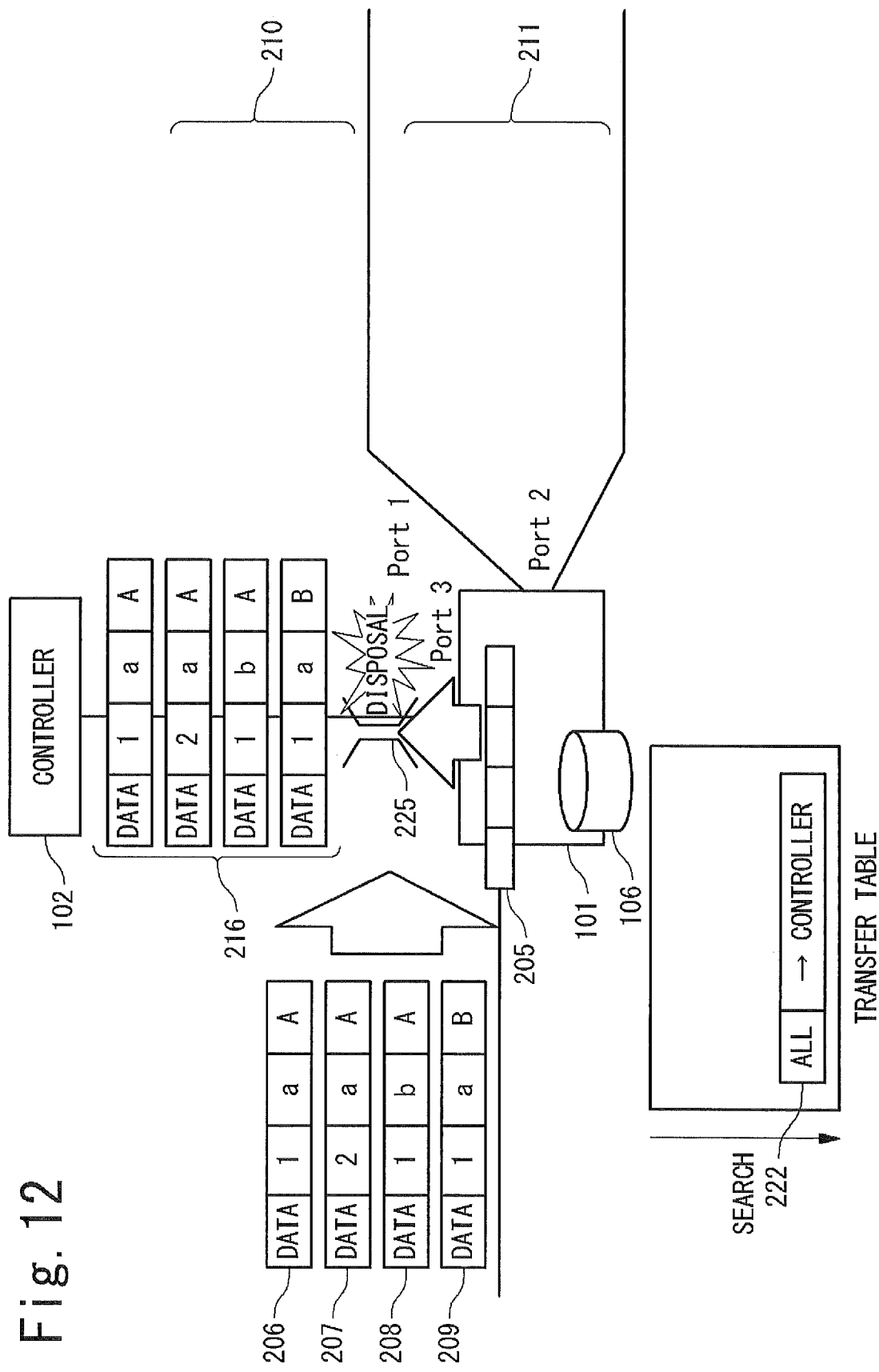
FIG. 12 is a diagram showing a flow of control in case of the start of the switch when the monitoring table does not exist in the second exemplary embodiment of the present invention.

Referring to FIG. 12, a flow of control (data) in case of the start of the switch when the monitoring table does not exist will be described.

Here, the monitoring table 107 does not exist in the switch 101 and only one transfer table 106 exists therein. It should be noted that the condition where the monitoring table 107 does not exist may include a condition that an entry corresponding to the reception packet is not registered on the monitoring table 107.

As shown in FIG. 12, when there is not the packet transfer entry such as the entry 212 or the entry 213 in the transfer table 106 (when there is only the packet transfer entry (entry 222) for transferring all the packets to the controller) upon the start of the switch, a large amount of packets received by the switch are transferred to the controller 102.

In this case, there is a problem that the discard of the packet has occurred, depending on the conditions such as the processing performance of the controller 102, the network band between the switch 101 and the controller 102, and the protocol processing efficiency of the switch 101.

Figure 13:
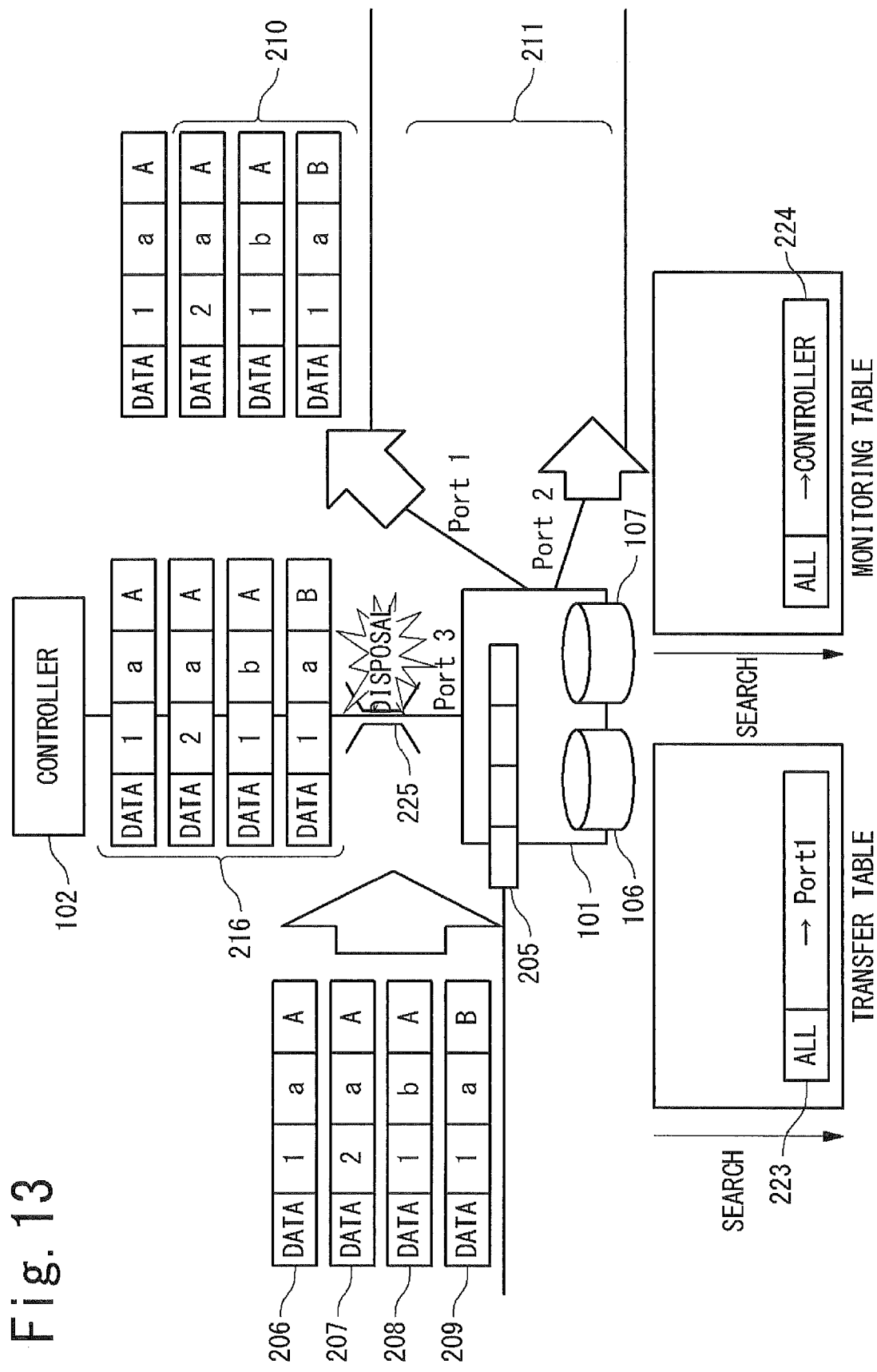
FIG. 13 is a diagram showing a flow of control in case of first packet transfer in the second exemplary embodiment of the present invention.
Figure 14:
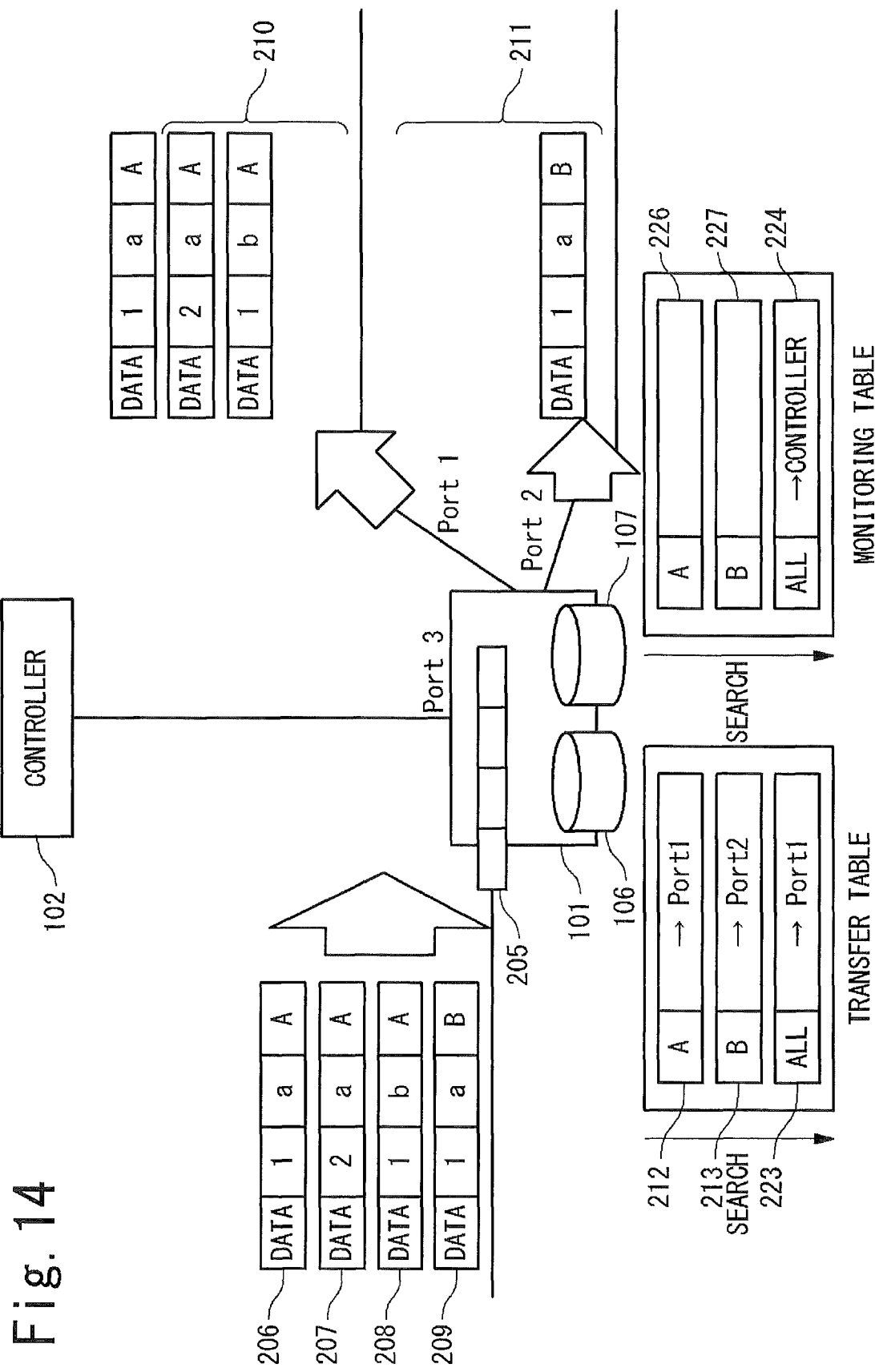
FIG. 14 is a diagram showing a flow of control in case of use of the monitoring table in the second exemplary embodiment of the present invention.

Therefore, a technique that the loss (deficit) of the first packet upon the start of the switch is avoided by effectively utilizing the monitoring table 107 will be described, as shown in FIGS. 13 and 14. It should be noted that the first packet is the first packet for which a corresponding entry is not registered on the flow table.

(Upon Transfer of First Packet)

Referring to FIG. 13, a flow of control (data) when the first packet upon the start of the switch is transferred to the controller by using the monitoring table will be described.

Here, both of the transfer table 106 and the monitoring table 107 exist in the switch 101.

A packet 216 shows a packet which is transferred to the controller 102 from the switch 101.

The entry 223 is one of the packet transfer entries registered on the transfer table 106, and shows a packet transfer entry to transfer all the packets to "Port1" (unconditionally).

The entry 224 shows a mirroring entry registered on the monitoring table 107 to transfer all the packets to the controller 102 (unconditionally).

A discard point 225 shows a discard point between the switch 101 and the controller 102.

As shown in FIG. 13, the packet transfer entry 223 is registered on the transfer table 106 to transfer all the packets to "Port1". The mirroring entry 224 is registered on the monitoring table 107 to transmit all the packets to the controller as mirror packets.

When receiving a usual packet, the hardware transfer section 104 in the switch 101 hardware-transfers the received packet to "Port1" according to the entry 223 of the transfer table 106.

In the switch according to the present invention, because the multi-hit operation of the transfer table 106 and the monitoring table 107 is made possible, the hardware transfer section 104 performs the hardware transfer of the reception packet according to the entry 223, and searches the monitoring table 107, to perform the mirroring operation to the controller 102 according to the hit entry 224 at the same time.

The packet 216 subjected to the mirroring operation is possible to be discarded as in FIG. 12, but there is no influence upon the communication, since the transfer processing (hardware transfer) of the packet is carried out according to the entry 223. That is, a target to be discarded is only the mirror packet (packet 216) which is obtained by copying the reception packet, and an output packet (packet group 210, packet group 211) in which a reception packet is hardware-transferred has no relation to the above.

In order to avoid the discard, the delivery of the mirror packet is sufficient to be carried out in a permissible range of the processing performance of the controller 102, the network band between the switch 101 and the controller 102, and the protocol processing performance of the switch.

In FIG. 13, the condition in which the mirror packet (packet 216) received by the controller 102 is analyzed and the routing control to the switch 101 is carried out based on the analysis result is shown in a condition of FIG. 14.

(Upon Use of Monitoring Table)

Referring to FIG. 14, a flow of control (data) when the monitoring table is used will be described.

The entry 226 has no operation to "the packet which contains "A"" registered on the monitoring table 107 or shows a discard entry to drop (discard) the packet.

The entry 227 has no operation to "the packet which contains "B"" registered on the monitoring table 107 or shows a discard entry to drop (discard) the packet.

The controller 102 can perform a load distribution routing control of the communication, by registering the packet transfer entry (entry 212) on the transfer table 106 to transfer "the packet which contains "A"" to "Port1", and the packet transfer entry (entry 213) on the transfer table 106 to transfer "the packet which contains "B"" to "Port2", as a result of the analysis of the mirror packet.

In this case, it is possible to reduce addition of the mirror packet to the controller 102 by registering a discard entry (entry 226, entry 227) which drops (discards) a packet or performs no operation, in the same rule (matching condition) as the packet transfer entry (entry 212, entry 213), on the monitoring table 107, at the same time as registering the packet transfer entry (entry 212, entry 213).

(Operation Sequence)

Figure 15:
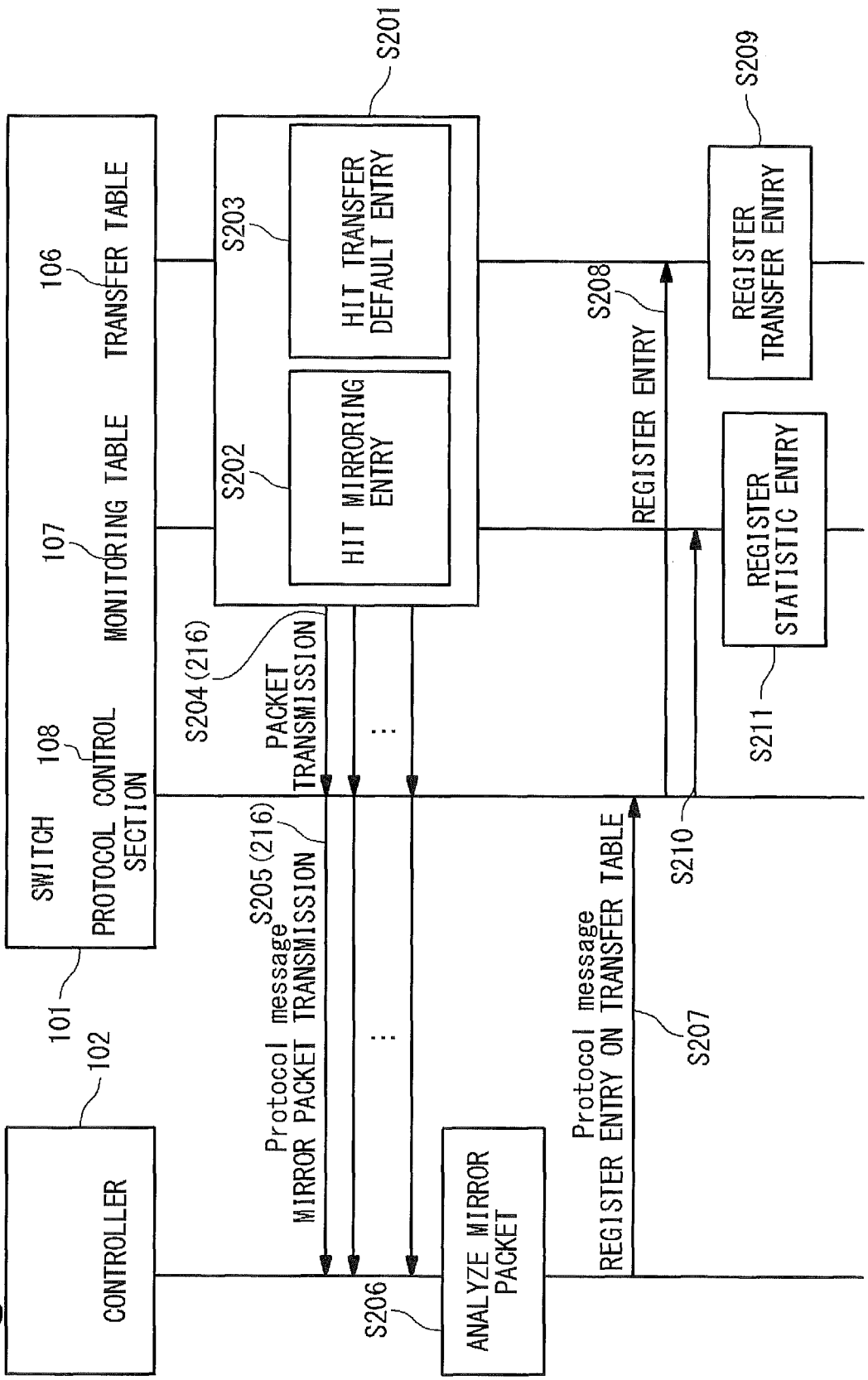
FIG. 15 is a sequence chart showing an operation of the switch system according to the second exemplary embodiment of the present invention.

Referring to FIG. 15, an operation sequence showing the switch system according to the second exemplary embodiment of the present invention will be described.

It should be noted that the switch 101 and the controller 102 are the same as those of FIG. 1.

(1) Step S201

The switch 101 is in the condition that the mirroring entry exists at the monitoring table 107 and that a transfer default entry is registered on the transfer table 106. For example, the controller 102 may register the mirroring entry on the monitoring table 107 and the transfer default entry on the transfer table 106 in the switch 101 in advance, when the switch starts.

Here, it is written in the mirroring entry that all the packets are transmitted to the controller 102 (unconditionally) as the mirror packets. Also, it is written in the transfer default entry that all the packets are transferred to a predetermined output destination (the controller 102 in this case) (unconditionally).

(2) Step S202

The hardware transfer section 104 in the switch 101 confirms whether or not a reception packet hits any mirroring entry registered on the monitoring table 107, when receiving the first packet. Here, because it is written in the mirroring entry that all the packets are transmitted to the controller 102 as the mirror packets, the reception packet hits one mirroring entry.

(3) Step S203

Moreover, the hardware transfer section 104 confirms whether or not the reception packet hits one transfer default entry registered on the transfer table 106. Here, because it is written in the transfer default entry that all the packets are transferred to a predetermined output destination (the controller 102 in this case), the reception packet hits one transfer default entry.

(4) Step S204

When the reception packet hits one mirroring entry registered on the monitoring table 107, and hits one transfer default entry registered on the transfer table 106, the hardware transfer section 104 transmits the packet (the packet 216 of FIG. 12) to the protocol control section 108 as an action (predetermined processing) which is written in the mirroring entry.

(5) Step S205

The protocol control section 108 transmits (mirrors) the above packet (the packet 216 of FIG. 12) to the controller 102 as the mirror packet by using "Protocol message".

That is, in the switch 101, the mirroring entry is registered on the monitoring table 107 to specify that all the packets are transmitted to the controller 102 as the mirror packets, and the transfer default entry is registered on the transfer table 106 to specify that all the packets are transferred to a predetermined output destination (the controller 102 to be in this case), and the switch 101 transfers the packet hitting one mirroring entry to the controller 102 through the protocol control section 108 by using the "protocol message".

(6) Step S206

The controller 102 analyzes the mirror packet transmitted thereto.

(7) Step S207

The controller 102 transmits a registration request of a packet transfer entry on the transfer table 106 to the switch 101 by using the "protocol message" based on the analysis result of the mirror packet. It should be noted that the registration request of the transfer entry using the "protocol message" may be common to a registration request of the statistic entry having the same rule (match condition) as the packet transfer entry.

(8) Step S208

The protocol control section 108 receives the packet transfer entry registration request to the transfer table 106 by using the "protocol message" from the controller 102 and registers the packet transfer entry on the transfer table 106.

(9) Step S209

The registration of the packet transfer entry on the transfer table 106 is completed. The hardware transfer section 104 starts the action (predetermined processing) written in the entry to the reception packet (the same reception packet as the above mirror packet) corresponding to the packet transfer entry from the time when the registration of the packet transfer entry is completed.

(10) Step S210

At the same time as the registration of the packet transfer entry on the transfer table 106, the protocol control section 108 registers on the monitoring table 107, a statistic entry with an action (predetermined processing) written to perform no operation or to drop (discard) the packet, in the same rule (match condition) as the above-mentioned packet transfer entry

(11) Step S211

The registration of the statistic entry on the monitoring table 107 is completed. The hardware transfer section 104 performs nor operation or the dropping (discarding) to the same type of reception packet as the above mirror packet, from the time when the registration of the statistic entry is completed.

That is, when receiving the mirror packet, the controller 102 analyzes the content of the mirror packet, and performs a control for the registration of a formal packet transfer entry on the transfer table 106 of the switch 101 by using the "protocol message" based on the analysis result.

Also, the controller 102 performs the control of the registration of the packet transfer entry on the transfer table 106 as mentioned above, and at the same time, performs a control of the registration on the monitoring table 107 of the statistic entry with the action (predetermined processing) written to perform no operation or dropping (discarding) in the same rule (match condition) as the above-mentioned packet transfer entry.

It should be noted that the protocol control section 108 may automatically register the statistic entry on the monitoring table 107 in the same rule (the match condition) as the above-mentioned packet transfer entry at the same time as the registration of the packet transfer entry on the transfer table 106, when receiving the registration request of the packet transfer entry on the transfer table 106 by using the "protocol message" from the controller 102.

(Feature of the Exemplary Embodiment)

In this way, in the exemplary embodiment, the effect is attained that a loss of the first packet flowing therein upon the start of the switch can be reduced, by modifying the mirroring function of the monitoring table and the multi-hit operation of the monitoring table and the transfer table.

Third Exemplary Embodiment

As a third exemplary embodiment of the present invention, a method in which a transfer table is prepared instead of the monitoring table, and the routing control is performed by using the two transfer tables will be described. The configuration will be described with reference to FIGS. 16 and 17.

It should be noted that in the present exemplary embodiment, the problem to be solved is to reduce the loss of the first packet upon the start of the switch, in the same way as the second exemplary embodiment of the present invention.

Figure 16:
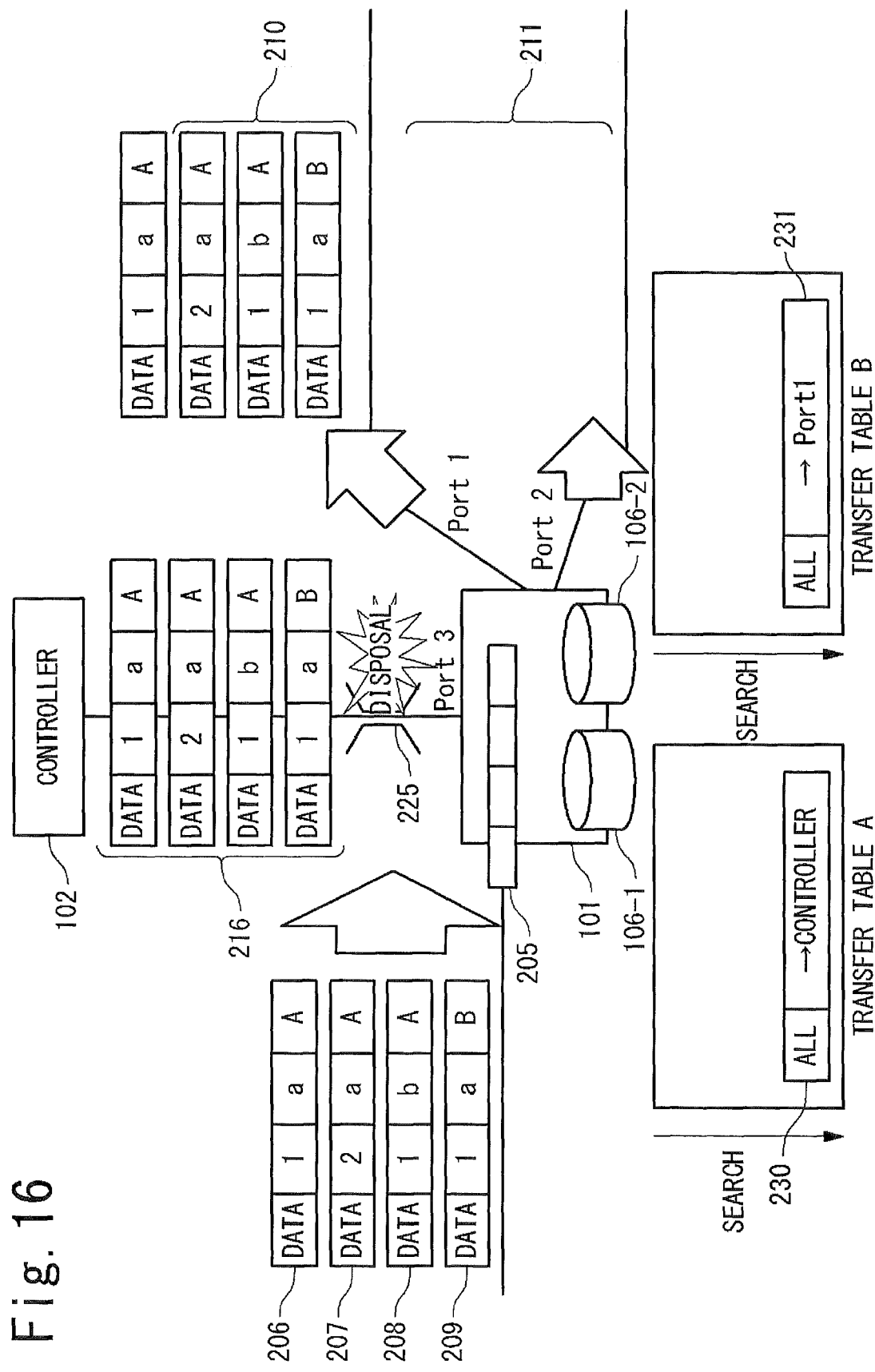
FIG. 16 is a diagram showing a flow of control in case of the first packet transfer in a third exemplary embodiment of the present invention.
Figure 17:
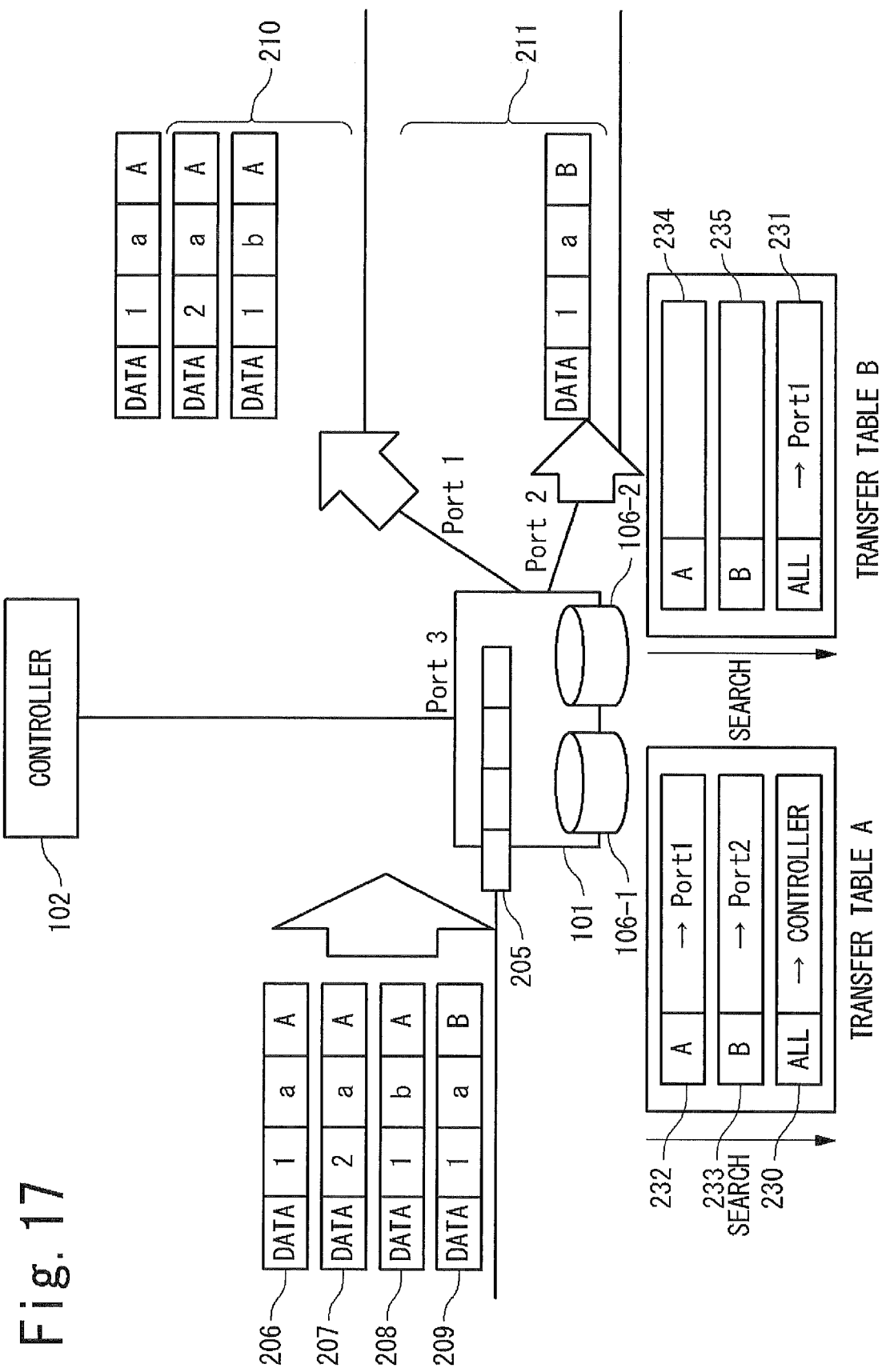
FIG. 17 is a diagram showing a condition when a routing control is performed in the third exemplary embodiment of the present invention.

In the present exemplary embodiment, by effectively using a transfer table A106-1 and a transfer table B106-2 are utilized as shown in FIGS. 16 and 17, a method of reducing the loss of the first packet upon the start of the switch, will be described.

As shown in FIG. 16, FIG. 17, in the switch 101 of the present exemplary embodiment, the transfer table A106-1 is prepared instead of the transfer table 106 for the packet transfer entry, and the transfer table B106-2 is prepared instead of the monitoring table 107 for the mirroring entry and the statistic entry.

It should be noted that the controller 102 is same as that of FIG. 1. The packet 205 to the entry 221 are same as those of FIGS. 4 to 9.

Also, the basic operation of the switch system of the present exemplary embodiment is the same as that of the first exemplary embodiment and the description is omitted.

The packet 205 shows a packet received by the switch 101.

The packet 206 shows a packet which contains "A", "a", "1", "DATA" as the internal configuration.

The packet 207 shows a packet which contains "A", "a", "2", "DATA" as the internal configuration.

The packet 208 shows a packet which contains "A", "b", "1", "DATA" as the internal configuration.

The packet 209 shows a packet which contains "B", "a", "1", "DATA" as the internal configuration.

The packet group 210 shows a packet group outputted from "Port1" of the switch 101. The packet group 210 contains the packet 206, the packet 207, the packet 208 and the packet 209 in this case.

The packet group 211 shows a packet group outputted from "Port2" of the switch 101. Because the corresponding packet does not exist, the packet group 211 contains nothing in this case.

The packet 216 shows a packet (mirror packet) which is transferred to the controller 102 from the switch 101.

A discard point 225 shows a discard point between the switch 101 and the controller 102.

The entry 230 is one of the packet transfer entries registered on the transfer table A106-1 and shows the transfer default entry to transfer all the packets to the controller 102 (unconditionally). It is possible to say that the entry 230 (transfer default entry) is one of the entries for the inquiry to the controller 102.

The entry 231 is one of the packet transfer entries registered on transfer table B106-2 and shows the packet transfer entry to transfer all packets to "Port1" (unconditionally).

As shown in FIG. 16, the packet transfer entry (entry 230) is registered on the transfer table A106-1 to transfer all the packets to the controller 102. The packet transfer entry (entry 231) to transfer all the packets to "Port1" is registered on the transfer table B106-2.

Because the switch according to the present invention makes the multi-hit operation to the transfer table A106-1 and the transfer table B106-2 possible, the transfer switch 101 searches the transfer table B106-2 when receiving the usual packet, and searches the transfer table A106-1, at the same time as performing hardware transfer to "Port1" according to the hit entry 231. Also, the transfer to the controller 102 is performed according to the hit entry 230.

At this time, although there is a possibility that the discard of the packet 216 transferred (mirrored) to the controller 102 occurs, there is no influence on the communication, even if the discard of the packet 216 as the mirror packet has occurred, because the transfer itself of the received packet is performed according to the entry 231.

The delivery of the mirror packet between the switch 101 and the controller 102 is enough to be executed in the range of the processing performance of the controller 102, the network band between the switch 101 and the controller 102, and the protocol processing performance of the switch.

In FIG. 16, the mirror packet (packet 216) received by the controller 102 is analyzed, and the condition which a routing control to the switch 101 is carried out based on the analysis result, is shown in of FIG. 17.

The entry 232 is one of the packet transfer entries registered on the transfer table A106-1, and shows the packet transfer entry to transfer "the packet which contains "A"" to "Port1".

The entry 233 is one of the packet transfer entries registered on the transfer table A106-1 and shows the packet transfer entry to transfer "the packet which contains "B"" to "Port2".

The entry 234 is one of the packet transfer entries registered on the transfer table B106-2 and shows the discard entry to perform no operation to "the packet which contains "A"" or to drop (discard).

The entry 235 is one of the packet transfer entries registered on the transfer table B106-2, and shows the discard entry which performs no operation "the packet which contains "B" or drops (discards).

The controller 102 analyzes a mirror packet (packet 216), and registers the packet transfer entry (entry 232) to transfer "the packet which contains "A"" to "Port1" and the packet transfer entry (entry 233) to transfer "the packet which contains "B"" to "Port2" on the table A, based on the analysis result. Thus, the routing controls such as the load distribution of the communication become able to be carried out.

Also, the controller 102 registers the discard entry (entry 234, entry 235) on the transfer table B to perform no operation or drop (discard), in the same rule (match condition) as the above-mentioned packet transfer entry, at the same time as registering the above-mentioned packet transfer entry (entry 232, entry 233) on the transfer table A. The hardware transfer (hardware transfer of all the packets) according to the entry 231 registered with any default.

(Feature of this Exemplary Embodiment)

In this way, in the present exemplary embodiment, the effect that the loss of the first packet flowing-therein can be reduced upon the start of the switch, like the second exemplary embodiment of the present invention.

(Relation of Each Exemplary Embodiment)

It should be noted that respective exemplary embodiments may be executed by combining them.

(Feature of the Present Invention)

As described above, in the present invention, the centralized control of the monitoring of the communication data is attained.

In the present invention, by combining the control protocol to perform the centralized control on the network and the monitoring, the monitoring of the switch system is subjected to the centralized control. The grain size of the monitoring can be changed freely, and reflection to the routing control of the network may be freely carried out.

Also, in the present invention, by performing the multi-hit operation on the transfer table and the monitoring table in the switch, the monitoring can be performed freely without having any influence on the data communication.

Also, in the present invention, separately from the transfer table, the monitoring table in which the packet transfer entry is not registered is prepared, and only the statistic entry and the mirroring entry are registered on this monitoring table and the multi-hit operation of them is performed.

That is, in the present invention, the transfer table and the monitoring table are provided as the flow table in the switch, and the multi-hit operation of them is performed to realize the transfer of the packet.

Also, in the present invention, only the statistic entry and the mirroring entry are registered on the monitoring table, and the registration of a routing control entry is not performed. That is, the setting is carried out so that the transfer hardware is not performed.

Also, in the present invention, by the control protocol to perform the centralized control on the network, the monitoring of the switch is subjected to the centralized control in conjunction with the controller.

Also, in the present invention, the centralized control of the monitoring of the switch is realized by using the control protocol, so that the loss of the first packet flowing-therein can be reduced upon the start of the switch.

In this way, in the present invention, the logic which detects packet loss is not used. While the hardware transfer is carried out by using the default entry in one table, the monitoring is carried out in another table, and the result is fed back to the packet transfer entry. By this, while initial flowed-in packets upon the restart of the switch are subjected to the hardware transfer without packet loss, each of the packets is analyzed, and finally the fine transfer control can be performed in a packet unit.

Also, in the present invention, the control protocol (e.g. the open flow) of the transmitter device is used to control the monitoring function of the switch system, so that the monitoring in which the centralized control is possible as the whole network is realized and the monitoring result can be reflected on the routing control.

Also, in the present invention, the transfer flow table and the monitoring flow table are provided in the switch, and both of the tables are searched to one packet to perform the multi-hit operation, i.e. the operation of the entries registered on the tables. Thus, the grain degree of the monitoring can be freely changed without being conscious of the routing control.

As described above, the exemplary embodiments of the present invention have been described in detail, but actually, the present invention is not limited to the above-mentioned exemplary embodiments and even if there is a modification which does not depart from the scope of the present invention, the modification is contained in the present invention.

It should be noted that this application claims a priority based on Japan Patent Application No. JP 2010-232772, and the disclosure thereof is incorporated herein by reference.

The invention claimed is:

1. A switch apparatus, comprising:
a memory storing a first flow table and a second flow table;
and a processor configured to execute instructions to:
receive, from an external control apparatus which connects with the switch apparatus, a first flow entry stored in the first flow table and a second flow entry stored in the second flow table, include a matching rule to identify a received packet and an action to forwarding the packet;
compare the received packet to the matching rule of the first flow table;
compare the received packet to the matching rule of the second flow table;
process the received packet, based on the action of the first flow table and the action of the second flow table, in response to the received packet that matches both the matching rule of the first flow table and the matching rule of the second flow table; and
forward, from the first flow table, the received packet to the control apparatus;
wherein the first flow table comprises a transfer table, and the second flow table comprises a monitoring table,
wherein the monitoring table comprises a mirroring entry and a statistic entry,
wherein the mirroring entry comprises a flow entry to transfer the received packet to an optional destination.

2. The switch apparatus according to claim 1, wherein the processor is further configured to execute the instructions to:
forward, from the second flow table, the received packet to a second switch apparatus.

3. The switch apparatus according to claim 1, wherein the processor is further configured to execute the instructions to:
 copy the received packet; and
 create two identical packets.

4. The switch apparatus according to claim 3, wherein the processor is further configured to execute the instructions to:
 transfer one of the two identical packets to a destination; and
 transfer another one of the two identical packets to the control apparatus.

5. The switch apparatus according to claim 1,
 wherein the first flow table relates to transfer actions, and the second flow table relates to monitoring actions.

6. A switch apparatus system, comprising:
 a switch;
 a control apparatus connected with the switch; and
 a neighboring switch connected with the switch,
 wherein the switch comprises:
  a memory storing a first flow table and a second flow table; and
  a processor configured to execute instructions to:
   receive, from the control apparatus, a first flow entry stored in the first flow table and a second flow entry stored in the second flow table, wherein the first flow entry and the second flow entry include a matching rule to identify a received packet and an action to forwarding the packet;
  compare the received packet to the matching rule of the first flow table;
  compare the received packet to the matching rule of the second flow table;
 process the received packet, based on the action of the first flow table and the action of the second flow table, in response to the received packet that matches both the matching rule of the first flow table and the matching rule of the second flow table; and
 forward, from the first flow table, the received packet to the control apparatus;
  wherein the first flow table comprises a transfer table, and the second flow table comprises a monitoring table,
   wherein the monitoring table comprises a mirroring entry and a statistic entry,
    wherein the mirroring entry comprises a flow entry to transfer the received packet to an optional destination.

7. The switch apparatus system according to claim 6, wherein the processor is further configured to execute the instructions to:
 forward, from the second flow table, the received packet to a second switch apparatus.

8. The switch apparatus system according to claim 6, wherein the processor is further configured to execute the instructions to:
 copy the received packet; and
 create two identical packets.

9. The switch apparatus system according to claim 8, wherein the processor is further configured to execute the instructions to:
 transfer one of the two identical packets to a destination; and
 transfer another one of the two identical packets to the control apparatus.

10. A method for a switch apparatus, the method comprising:
 receiving, from an external control apparatus which connects with the switch apparatus, a first flow entry stored in a first flow table and a second flow entry stored in a second flow table, wherein the first flow entry and the second flow entry include a matching rule to identify a received packet and an action to forwarding the packet;
 comparing a received packet to the matching rule of the first flow table;
 comparing the received packet to the matching rule of the second flow table;
 processing the received packet, based on the action of the first flow table and the action of the second flow table, in response to the received packet that matches both the matching rule of the first flow table and the matching rule of the second flow table: and
 forwarding, from the first flow table, the received packet to the control apparatus;
  wherein the first flow table comprises a transfer table, and the second flow table comprises a monitoring table,
   wherein the monitoring table comprises a mirroring entry and a statistic entry,
    wherein the mirroring entry comprises a flow entry to transfer the received packet to an optional destination.

11. The method for a switch apparatus according to claim 10, further comprising:
 forwarding, from the second flow table, the received packet to a second switch apparatus.

12. The method for a switch apparatus according to claim 10, further comprising:
 copying the received packet; and
 creating two identical packets.

13. The method for a switch apparatus according to claim 12, further comprising:
 transferring one of the two identical packets to a destination; and
 transferring another one of the two identical packets to the control apparatus.

14. A non-transitory computer-readable storage medium which stores a control program of a switch apparatus, wherein the control program, when executed by a computer, causes the switch apparatus to execute a method, the method comprising:
 receiving, from an external control apparatus which connects with the switch apparatus, a first flow entry stored in a first flow table and a second flow entry stored in a second flow table, wherein the first flow entry and the second flow entry include a matching rule to identify a received packet and an action to forwarding the packet;
 comparing a received packet to the matching rule of the first flow table;
 comparing the received packet to the matching rule of the second flow table;
 processing the received packet, based on the action of the first flow table and the action of the second flow table, in response to the received packet that matches both the matching rule of the first flow table and the matching rule of the second flow table; and
 forwarding, from the first flow table, the received packet to the control apparatus;
  wherein the first flow table comprises a transfer table, and the second flow table comprises a monitoring table,
   wherein the monitoring table comprises a mirroring entry and a statistic entry,
    wherein the mirroring entry comprises a flow entry to transfer the received packet to an optional destination.

15. The computer-readable storage medium according to claim 14, further comprising:
forwarding, from the second flow table, the received packet to a second switch apparatus.

16. The computer-readable storage medium according to claim 15, further comprising:
copying the received packet; and
creating two identical packets.

* * * * *

UNITED STATES PATENT AND TRADEMARK OFFICE
CERTIFICATE OF CORRECTION

PATENT NO. : 10,623,314 B2
APPLICATION NO. : 13/824356
DATED : April 14, 2020
INVENTOR(S) : Kazushi Kubota et al.

It is certified that error appears in the above-identified patent and that said Letters Patent is hereby corrected as shown below:

In the Claims

Claim 1, Column 20, Line 43:
"stored in the second flow table, include a matching"
Should read:
--stored in the second flow table, wherein the first flow entry and the second flow entry include a matching--.

Signed and Sealed this
Fourth Day of August, 2020

Andrei Iancu
*Director of the United States Patent and Trademark Office*